US012551937B2

(12) United States Patent
Wang et al.

(10) Patent No.: US 12,551,937 B2
(45) Date of Patent: Feb. 17, 2026

(54) ADDITIVE MANUFACTURING FEEDSTOCK PRODUCTION SYSTEM FOR REACTIVE WIRE AND RELATED METHODS

(71) Applicant: The Texas A&M University System, College Station, TX (US)

(72) Inventors: Shiren Wang, College Station, TX (US); Ruochen Liu, Bryan, TX (US); Aolin Hou, College Station, TX (US); Chongjie Gao, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 314 days.

(21) Appl. No.: 18/188,658

(22) Filed: Mar. 23, 2023

(65) Prior Publication Data

US 2023/0302512 A1    Sep. 28, 2023

Related U.S. Application Data

(60) Provisional application No. 63/269,784, filed on Mar. 23, 2022.

(51) Int. Cl.
*B21B 1/40* (2006.01)
*B33Y 40/10* (2020.01)

(52) U.S. Cl.
CPC ............... *B21B 1/40* (2013.01); *B33Y 40/10* (2020.01)

(58) Field of Classification Search
CPC ..... B21C 37/045; B21C 37/042; B23K 35/40; B21B 15/0007
See application file for complete search history.

(56) References Cited

U.S. PATENT DOCUMENTS 4,048,705 A * 9/1977 Blanpain ............ B23K 35/0266
228/56.3
4,203,188 A * 5/1980 Blanpain ............ B23K 35/406
419/61

(Continued)

OTHER PUBLICATIONS

U.S. Appl. No. 18/188,564, filed Mar. 23, 2023 Wang et al.

*Primary Examiner* — Michael W Hotchkiss
(74) *Attorney, Agent, or Firm* — Allen, Dyer, Doppelt + Gilchrist, PA

(57) ABSTRACT

An additive manufacturing feedstock production system includes a transition roller configured to combine reactive metal foils into combined reactive metal foils with a first combined thickness. The additive manufacturing feedstock production system includes a work roller configured to compress the combined reactive metal foils to a second combined thickness less than the first combined thickness, and a first processing module configured to segment and stack the combined reactive metal foils into stacked reactive metal foils, and feed the stacked reactive metal foils into the work roller. The work roller is configured to repeatedly compress the stacked reactive metal foils into compressed stacked reactive metal foils with a stacked thickness equal to the second combined thickness. The additive manufacturing feedstock production system has a second processing module configured to segment the compressed stacked reactive metal foils into a wire feedstock. An alternative first processing module downstream from the work roller is configured to roll the combined reactive metal foils into rolled reactive metal foils. A work groove roller is downstream from the first processing module and configured repeatedly compress the rolled reactive metal foils into compressed rolled reactive metal foils with a roll diameter equal to a groove diameter into a wire feedstock.

20 Claims, 29 Drawing Sheets

(56) References Cited

U.S. PATENT DOCUMENTS

| | | | |
|---|---|---|---|
| 6,823,571 B1* | 11/2004 | Ragland | B21D 47/00 |
| | | | 428/184 |
| 10,507,638 B2 | 12/2019 | Nuechterlein et al. | |
| 10,759,159 B2* | 9/2020 | Wilenski | B29C 64/321 |
| 12,091,720 B2* | 9/2024 | Stuth | B23K 35/40 |
| 2004/0011438 A1* | 1/2004 | Lorentzen | C22C 21/00 |
| | | | 266/212 |
| 2005/0044687 A1* | 3/2005 | Matsuguchi | B21C 37/042 |
| | | | 29/455.1 |
| 2010/0047616 A1* | 2/2010 | Urevich | C23C 4/131 |
| | | | 428/650 |
| 2015/0299824 A1* | 10/2015 | Prest | C22C 1/11 |
| | | | 72/200 |
| 2017/0173735 A1* | 6/2017 | Hsu | B22F 5/12 |
| 2017/0343984 A1 | 11/2017 | Czinger et al. | |
| 2018/0162013 A1* | 6/2018 | Fulop | C09D 133/12 |
| 2018/0311757 A1 | 11/2018 | Bucknell et al. | |
| 2018/0311769 A1 | 11/2018 | TenHouten et al. | |
| 2018/0339466 A1 | 11/2018 | El Naga et al. | |
| 2019/0039138 A1 | 2/2019 | Zafar et al. | |
| 2019/0262878 A1* | 8/2019 | Andre | H01M 4/405 |
| 2019/0391563 A1 | 12/2019 | Macey | |
| 2020/0079028 A1 | 3/2020 | Miller et al. | |
| 2020/0230870 A1 | 7/2020 | Lakshman et al. | |
| 2021/0170517 A1 | 6/2021 | El Naga et al. | |
| 2021/0229208 A1 | 7/2021 | Yang et al. | |
| 2021/0229357 A1 | 7/2021 | Yang et al. | |
| 2021/0252803 A1 | 8/2021 | John et al. | |
| 2021/0268738 A1 | 9/2021 | Kenworthy | |
| 2022/0088608 A1 | 3/2022 | Teng et al. | |
| 2022/0088685 A1 | 3/2022 | Kenworthy et al. | |
| 2022/0176449 A1 | 6/2022 | Lakshman et al. | |
| 2022/0288693 A1 | 9/2022 | Kenworthy et al. | |
| 2022/0339875 A1 | 10/2022 | Czinger et al. | |

* cited by examiner

ADDITIVE MANUFACTURING FEEDSTOCK PRODUCTION SYSTEM FOR REACTIVE WIRE AND RELATED METHODS

RELATED APPLICATION

This application is based upon prior filed Application No. 63/269,784 filed Mar. 23, 2022, the entire subject matter of which is incorporated herein by reference in its entirety.

TECHNICAL FIELD

The present disclosure relates to the field of manufacturing, and, more particularly, to additive manufacturing and related methods.

BACKGROUND

Currently, a common method for additive manufacturing of metals is powder bed fusion (i.e., selective laser melting, directed-energy deposition, binder jetting). This powder bed fusion approach may be based on layer wise consolidation of powder feedstock. Although some approaches are targeting high fabrication throughput, the powder-based process may be intrinsically slow in production rate. Other approaches may use wire as the feedstock material, such as wire-arc additive manufacturing and wire-direct energy deposition (DED) and may show faster material deposition speed. These approaches may have restricted fabrication throughput due to limitations on the external power source for melting the wire feedstock.

U.S. Pat. No. 10,507,638 to Nuechterlein et al. discloses an additive manufacturing method including providing a first and a second material, the second material capable of reacting with the first material to form a reaction product, forming at least the first material into a first layer, and subjecting at least a portion of the first layer to energy in the presence of the second material. The energy initiates a reaction between at least the first and second materials to form a portion of the article. A potential drawback to this approach may be complex implementation and slow fabrication throughput.

Some approaches may include on-site manufacturing and repairing. However, the additive manufacturing of the part is still a separate process where the part is printed and assembled onto the product. Inflexible powder-based printing and harsh conditions of current wire-based technology may be limiting on-site manufacturing.

SUMMARY

Generally, an additive manufacturing feedstock production system comprises a plurality of feedstock supplies configured to respectively output a plurality of reactive metal foils, and a transition roller downstream from the plurality of feedstock supplies and configured to combine the plurality of reactive metal foils into a combined plurality of reactive metal foils with a first combined thickness. The additive manufacturing feedstock production system comprises a work roller downstream from the transition roller and configured to compress the combined plurality of reactive metal foils to a second combined thickness less than the first combined thickness, and a first processing module downstream from the work roller. The first processing module is configured to segment and stack the combined plurality of reactive metal foils into a stacked plurality of reactive metal foils, and feed the stacked plurality of reactive metal foils into the work roller. The work roller is configured to repeatedly compress the stacked plurality of reactive metal foils into a compressed stacked plurality of reactive metal foils with a stacked thickness equal to the second combined thickness. The additive manufacturing feedstock production system also includes a second processing module configured to segment the compressed stacked plurality of reactive metal foils into a wire feedstock.

In some embodiments, the additive manufacturing feedstock production system may also include a pre-treatment module upstream of the transition roller and configured to remove surface contaminants from the plurality of reactive metal foils. Also, the work roller may be configured to repeatedly compress the stacked plurality of reactive metal foils until a specific contact area metric threshold is exceeded. For example, the specific contact area metric threshold may be greater than $0.20\ \mu m^2/\mu m^3$.

Also, the plurality of feedstock supplies may comprise first metal reactive foils, and second metal reactive foils interweaved with the first metal reactive foils. For example, each of the plurality of reactive metal foils may have a thickness in a range of 5-20 μm. The work roller may be configured to repeatedly compress the stacked plurality of reactive metal foils at least 3 times. The plurality of reactive metal foils may comprise at least one of a nickel foil, an aluminum foil, and a titanium foil. In some embodiments, the additive manufacturing feedstock production system may further comprise an additional roller downstream from the work roller.

Another aspect is directed to an additive manufacturing feedstock production system comprising a plurality of feedstock supplies configured to respectively output a plurality of reactive metal foils, and a transition roller downstream from the plurality of feedstock supplies and configured to combine the plurality of reactive metal foils into a combined plurality of reactive metal foils with a first combined thickness. The additive manufacturing feedstock production system also includes a work roller downstream from the transition roller and configured to compress the combined plurality of reactive metal foils to a second combined thickness less than the first combined thickness, and a first processing module downstream from the work roller and configured to roll the combined plurality of reactive metal foils into a rolled plurality of reactive metal foils. The additive manufacturing feedstock production system also includes a work groove roller downstream from the first processing module and configured to repeatedly compress the rolled plurality of reactive metal foils into a compressed rolled plurality of reactive metal foils with a roll diameter equal to a groove diameter into a wire feedstock.

Another aspect is directed to a method for making an additive manufacturing feedstock. The method comprises outputting a plurality of reactive metal foils respectively from a plurality of feedstock supplies, and combining the plurality of reactive metal foils into a combined plurality of reactive metal foils with a first combined thickness. The method further includes compressing the combined plurality of reactive metal foils to a second combined thickness less than the first combined thickness, segmenting and stacking the combined plurality of reactive metal foils into a stacked plurality of reactive metal foils, and repeatedly compressing the stacked plurality of reactive metal foils into a compressed stacked plurality of reactive metal foils with a stacked thickness equal to the second combined thickness. The method also includes segmenting the compressed stacked plurality of reactive metal foils into a wire feedstock.

DETAILED DESCRIPTION

Figure 1:
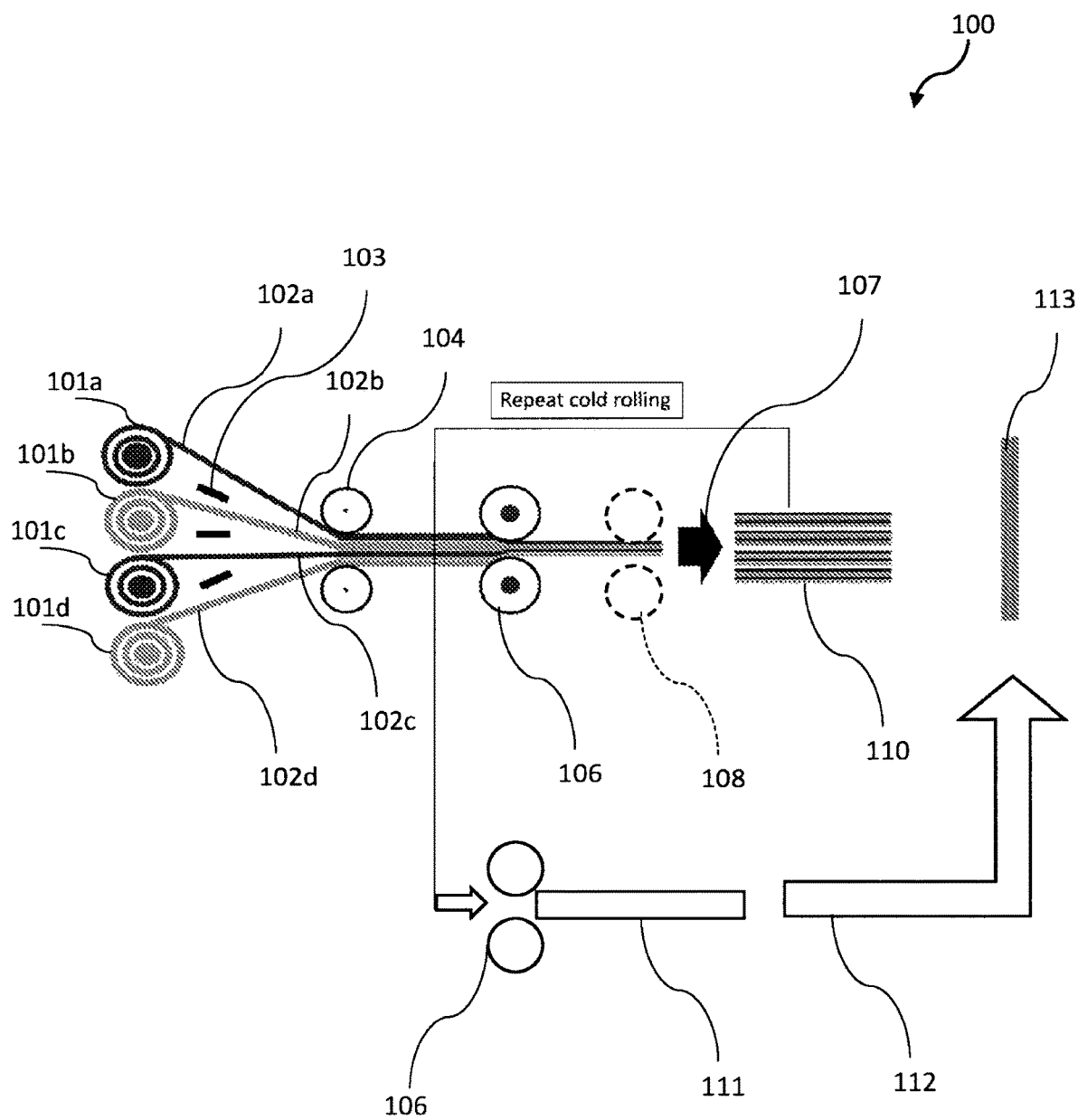
FIG. 1 is a schematic diagram of a first embodiment of an additive manufacturing feedstock production system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

The disclosed embodiments have a unique exothermic, high temperature, reactive wire-based feature for processing of larger feedstock. This provides an approach that overcomes the constraints of power supply and improves manufacturing throughput. The produced part from typical powder-based additive manufacturing may be poor in surface quality due to the unfused/partially fused powders attached to the part surface. The typical approach is usually related to costly post-processing (i.e., centrifugal disc finishing, centrifugal barrel finishing, and media blasting).

Advantageously, the disclosed embodiments may use reactive wire based feedstock so that the produced part has a smoother surface finish. In addition, the powders in existing approaches may require extra safety precautions during storage and manipulation of the feedstock. On the other hand, the disclosed embodiments use wire-based feedstock that is non-toxic and inert at ambient environment. The disclosed embodiments include simple systems, and the direct wire writing feature may be compatible with flexible on-site manufacturing once combined with a robotic arm with a high number of degrees of freedom.

Generally, an additive manufacturing feedstock production system may include a plurality of feedstock supplies, and a transition roller downstream from the plurality of feedstock supplies. The additive manufacturing feedstock production system may also include a work roller downstream from the transition roller.

The additive manufacturing feedstock production system may also include an additional roller downstream from the work roller. The additive manufacturing feedstock production system may further comprise a cutting and restacking module downstream from the work roller. The plurality of feedstock supplies may include a nickel supply and an aluminum supply, for example.

The present disclosure includes a new additive manufacturing method to produce metal three dimensional (3D) parts. The method includes rolling/compacting of two active metallic foils to fabricate the reactive feedstock, and computer controlled direct writing of reacting metal feedstock on a printing bed. Specifically, a self-propagating reaction is initiated by heating the end of reactive feedstock, and the external heat is removed. Then, the highly heat-releasing reaction will propagate along the feedstock, melting the solid feedstock at the same time.

The softened material can be deposited in a digitally controlled manner before turning solid and forming desired structures. The additive manufacturing embodiment can benefit from the manufacturing of low weight and high temperature metal alloys. Also, this method may have potential applications in aviation and aerospace industries, for example.

The implementation of powder-free reactive printing includes: fabrication of reactive metal feedstock; and an additive manufacturing process. The reactive metal foils are metallic foils combinations that react and produce self-propagation reaction. For example, the combination may include aluminum/nickel and aluminum/titanium. During fabrication of the reactive feedstock, the reactive metallic foils are stacked in ways such that the feedstock can produce self-propagation reaction after surface treatment that removes surface contamination and oxides.

Then, the reactive feedstock wire may be produced in two ways. In the first embodiment, shown in FIG. 1, the surface treated (i.e., to remove oxides and contaminates) foils are compacted by a roller mill. The stacked foils are then cut in half and restacked together and then fed through the roller mill until the thickness is reduced to previous level before cutting. The process is repeated as the specific contact area increases until the desired specific contact area is achieved so that the self-propagation reaction can happen. The specific contact area is defined as the contact area between reactive foils in unit volume. Then, the stacked foils are cut into wires as the reactive feedstock for additive manufacturing.

Figure 2:
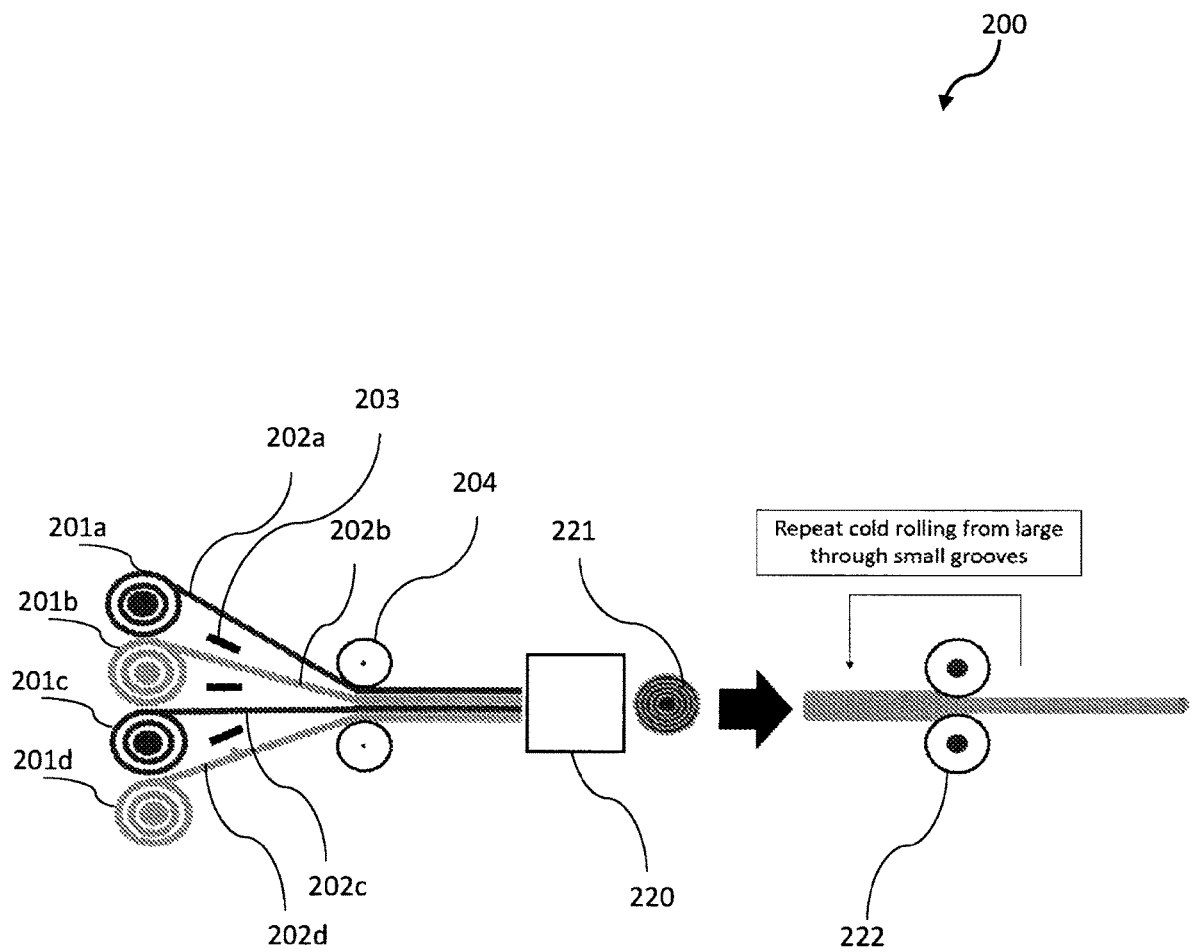
FIG. 2 is a schematic diagram of a second embodiment of the additive manufacturing feedstock production system, according to the present disclosure.

In a second embodiment shown in FIG. 2, the surface treated foils are stacked and rolled to a rod shape. Then, the rod is fed through the groove spaces on roller mill from a large diameter to a small diameter, shown in FIG. 3, until the desired specific contact area is reached so that the self-propagation reaction can happen. The rod is used as the reactive feedstock for additive manufacturing process.

Figure 4:
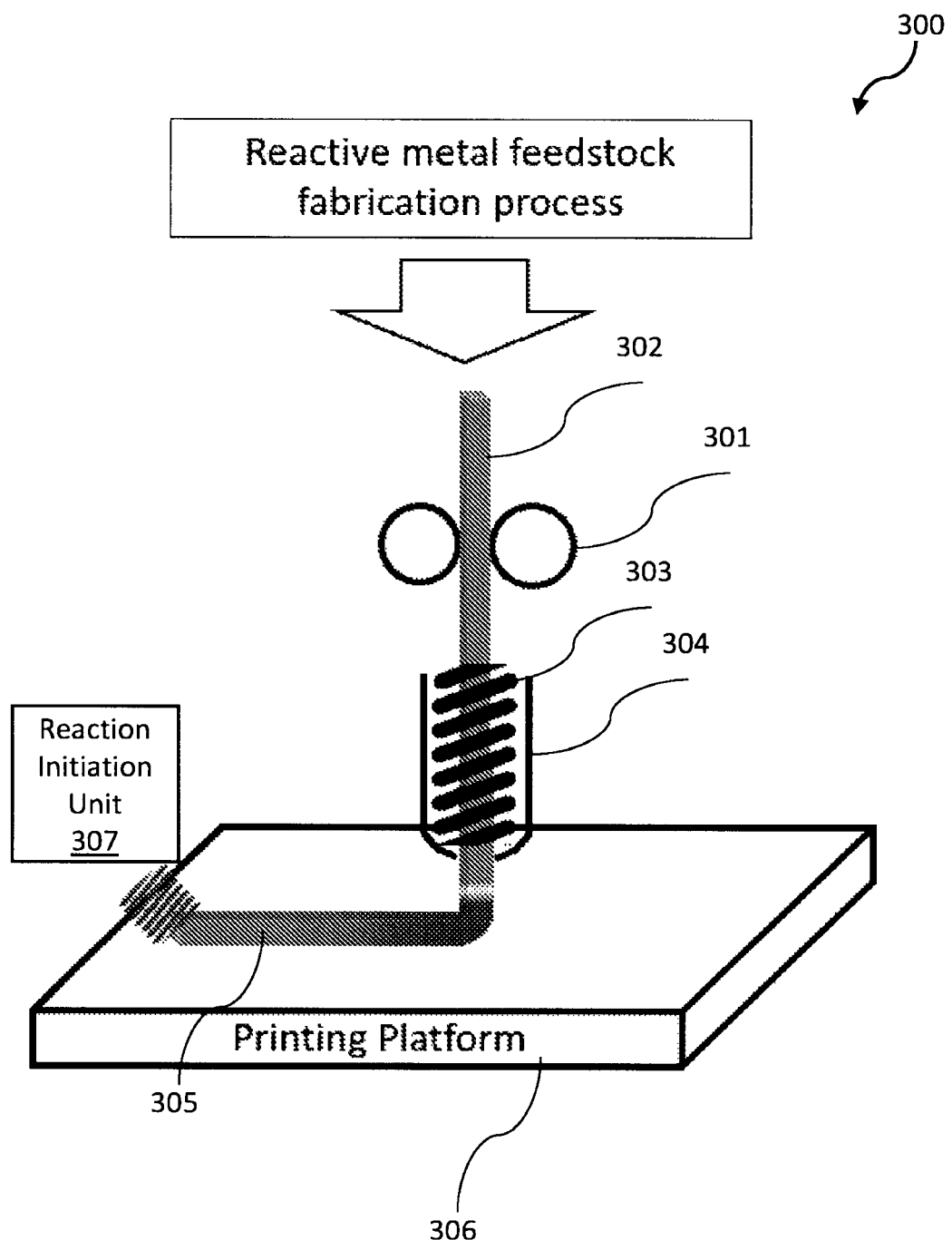
FIG. 4 is a schematic diagram of an additive manufacturing device, according to the present disclosure.
Figure 5A:
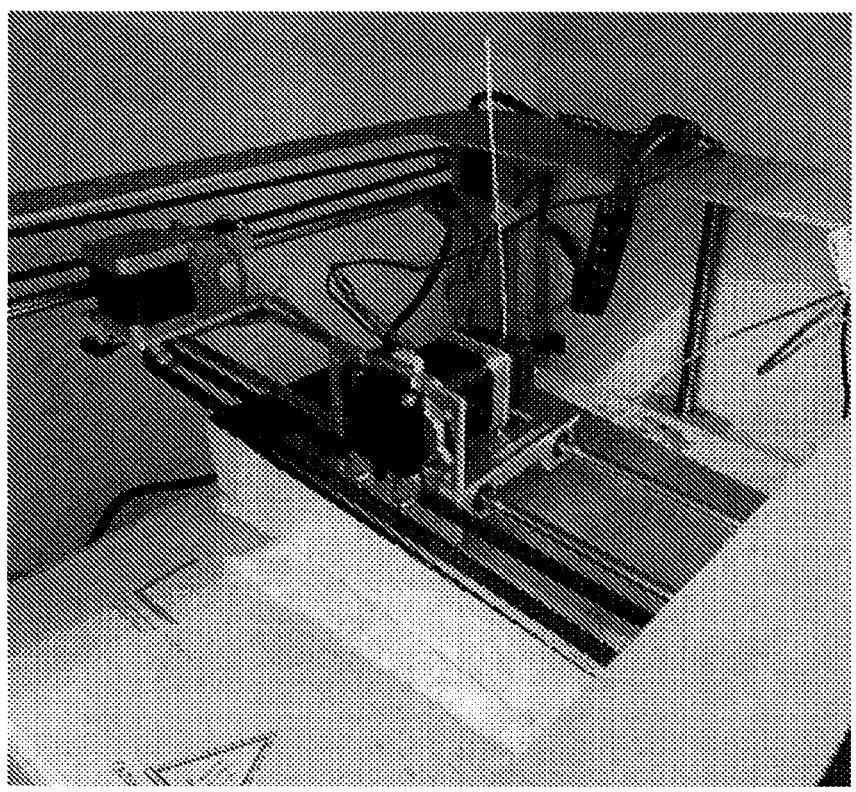
FIG. 5A is an image of an exemplary embodiment of an additive manufacturing device, according to the present disclosure.
Figure 5B:
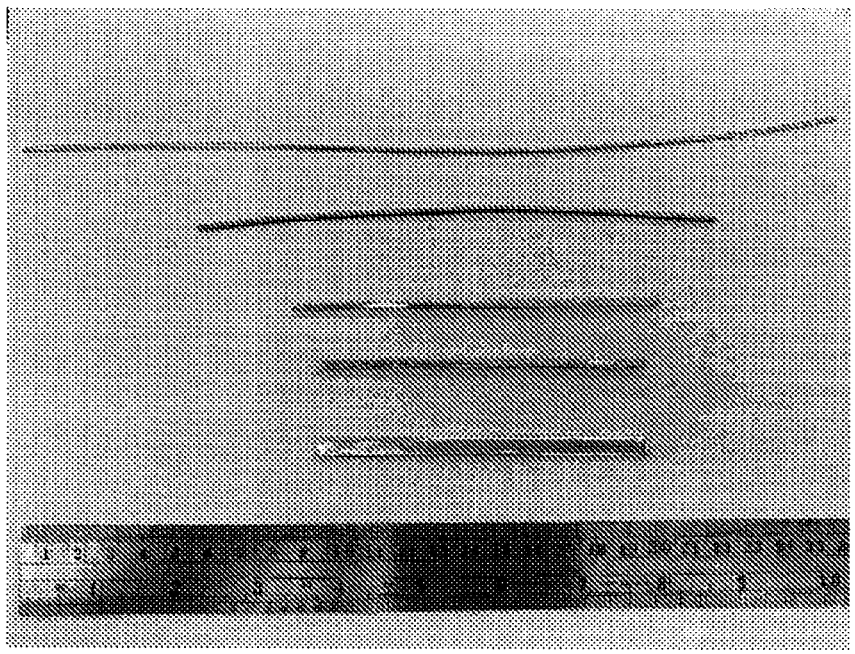
FIG. 5B is an image of reactive feedstock with different sizes for the exemplary embodiment of the additive manufacturing device, according to the present disclosure.
Figure 5C:
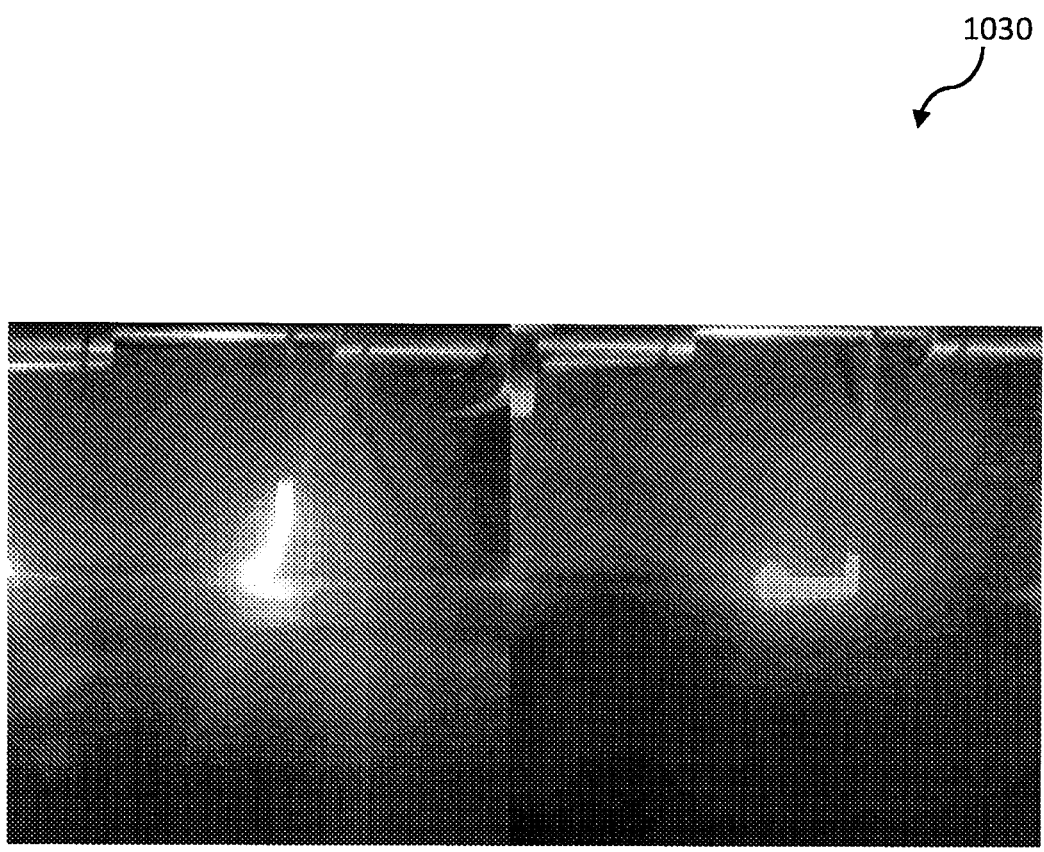
FIG. 5C is an image of a time-resolved reaction of the reactive feedstock, during printing, for the exemplary embodiment of the additive manufacturing device, according to the present disclosure.
Figure 5D:
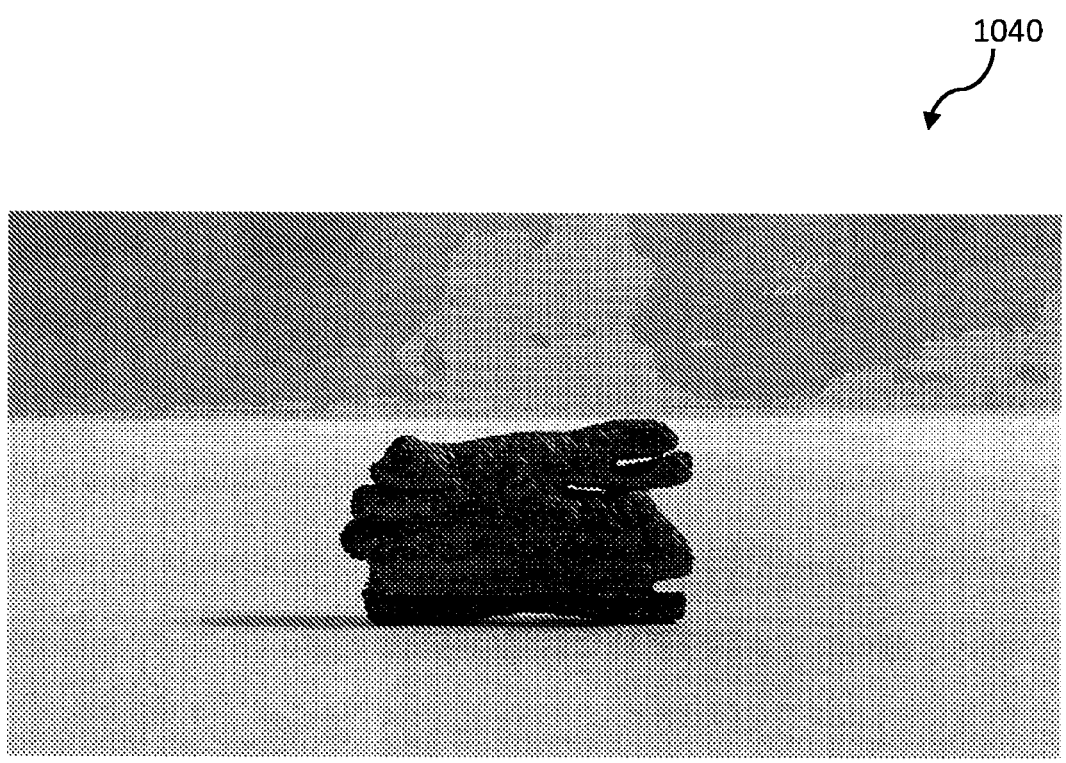
FIG. 5D is an image of a printed wall structure produced by the exemplary embodiment of the additive manufacturing device, according to the present disclosure.

The additive manufacturing process is illustrated in FIG. 4. The reactive feedstock is fed from the feeding roller through the nozzle. The optional preheating unit is used for heating the reactive feedstock to a temperature that favors the self-propagation reaction. The self-propagation reaction can be triggered by an external heating unit at one end of the reactive feedstock. The speed of deposition and motion is controlled by computer to match the self-propagation reaction speed so that the deposition, reaction, and softening of the reactive feedstock are synchronized that favors the printing process.

The present embodiments may provide an approach to problems of the prior art. In particular, the disclosed embodiments may increase the throughput of metal additive manufacturing. The disclosed embodiments may improve the surface quality of the as-printed part, reduce the complexity during handling and storage, and reduce the safety concerns of the feedstock materials. The disclosed embodiments may reduce the cost and of metal additive manufacturing process that is associated with power equipment and energy consumption.

The disclosed embodiments may resolve the dilemma that equipment payload and cost increase with feedstock size. It significantly reduces the metal additive manufacturing power source payload, and, simultaneously, it enables in-situ additive manufacturing of a large piece. The disclosed embodiments may enable the unmet need of on-demand, on-site manufacturing, and repairing of metallic structures.

In the disclosed embodiments, a continuous reactive wire is used as the feedstock material, which significantly increases the additive manufacturing throughput. The disclosed embodiments may enable safer and easier storage and manipulation of the feedstock material because it is very stable, and the reaction can only be triggered at a high temperature (e.g., >1000° C.). The wire surface is also smoother compared to the as-printed powder-based technology.

The disclosed embodiments may utilize the feedstock reaction to enable the in-situ melting and subsequent solidification of the part. There is no size limit for the reactive feedstock. In fact, larger printed pieces that generate more heat during reaction are considered to be more desirable for reactive process than smaller ones.

Due to the exothermic and self-propagating nature of the reaction, the disclosed embodiments may only require a small amount of external energy input, including transient initiation energy (e.g., <5 s) and feedstock preheating energy (significantly lower than melting temperature). The reactive feature of the direct reactive metal writing technology may provide an in-situ produced part in one-step. The disclosed embodiments may provide a simple, which includes the initiation system, feedstock wire delivery system and feedstock preheating system. These features meet the need of on demand, on-site manufacturing and repairing of metallic structures.

In an example application of the disclosed embodiments, reactive metal feedstock printing was used for printing a 5-layer wall structure. The printed part has a flexural strength of 180 MPa. The wire feeding speed is recorded as 3 m/min, which is comparable to high speed wire arc additive manufacturing. However, the feedstock material of the disclosed embodiments is not limited by the available external high power input system, and the wire diameter (e.g., >5 mm) is significantly larger than other wire-based technologies (e.g., <2 mm). Thus, the manufacturing throughput may be greatly improved while the cost for equipment and energy consumption does not increase significantly. The reaction of feedstock can only be triggered at a high temperature (e.g., ~1050° C.), providing for safe handling compared to typical powder based systems.

Referring initially to FIG. 1, an additive manufacturing feedstock production system 100 according to the present disclosure is now described. The additive manufacturing feedstock production system 100 illustratively comprises a plurality of feedstock supplies 101a-101d configured to respectively output a plurality of reactive metal foils 102a-102d. The plurality of reactive metal foils 102a-102d may comprise at least one of a nickel foil, an aluminum foil, and a titanium foil.

The additive manufacturing feedstock production system 100 illustratively comprises a pre-treatment module (pre-treater) 103 downstream of the plurality of feedstock supplies 101 a-101 d and configured to remove surface contaminants from the plurality of reactive metal foils 102 a-102 d. In particular, the pre-treatment module 103 may remove surface contaminants, for example, oxides.

The additive manufacturing feedstock production system 100 comprises a transition roller 104 downstream from the plurality of feedstock supplies 101a-101d and the pre-treatment module 103. The transition roller 104 is configured to combine the plurality of reactive metal foils 102a-102d into a combined plurality of reactive metal foils 105 with a first combined thickness. Also, the plurality of feedstock supplies 101a-101d illustratively includes first metal reactive foils 102a, 102c, and second metal reactive foils 102b, 102d interweaved with the first metal reactive foils. For example, each of the plurality of reactive metal foils 102a-102d may have a thickness in a range of 5-20 µm.

The additive manufacturing feedstock production system 100 comprises a work roller 106 downstream from the transition roller 104. The work roller 106 is configured to compress the combined plurality of reactive metal foils 105 to a second combined thickness less than the first combined thickness.

The additive manufacturing feedstock production system 100 comprises a first processing module (first mechanical processor) 107 downstream from the work roller 106. In some embodiments, the additive manufacturing feedstock production system 100 may optionally comprise an additional roller 108 (depicted with dashed lines) downstream from the work roller 106. The first processing module 107 is configured to segment and stack the combined plurality of reactive metal foils 105 into a stacked plurality of reactive metal foils 110, and feed the stacked plurality of reactive metal foils back upstream into the work roller 106.

The work roller 106 is configured to repeatedly compress the stacked plurality of reactive metal foils 110 into a compressed stacked plurality of reactive metal foils 111 with a stacked thickness equal to the second combined thickness. Also, the work roller 106 is configured to repeatedly compress the stacked plurality of reactive metal foils 110 until a specific contact area metric threshold is exceeded. For example, the specific contact area metric threshold may be greater than 0.20 $\mu m^2/\mu m^3$. In some embodiments, the work roller 106 may be configured to repeatedly compress the stacked plurality of reactive metal foils 110 at least 3 times, for example. The additive manufacturing feedstock production system 100 also includes a second processing module (second mechanical processor) 112 configured to segment the compressed stacked plurality of reactive metal foils 111 into a wire feedstock 113.

Figure 19:
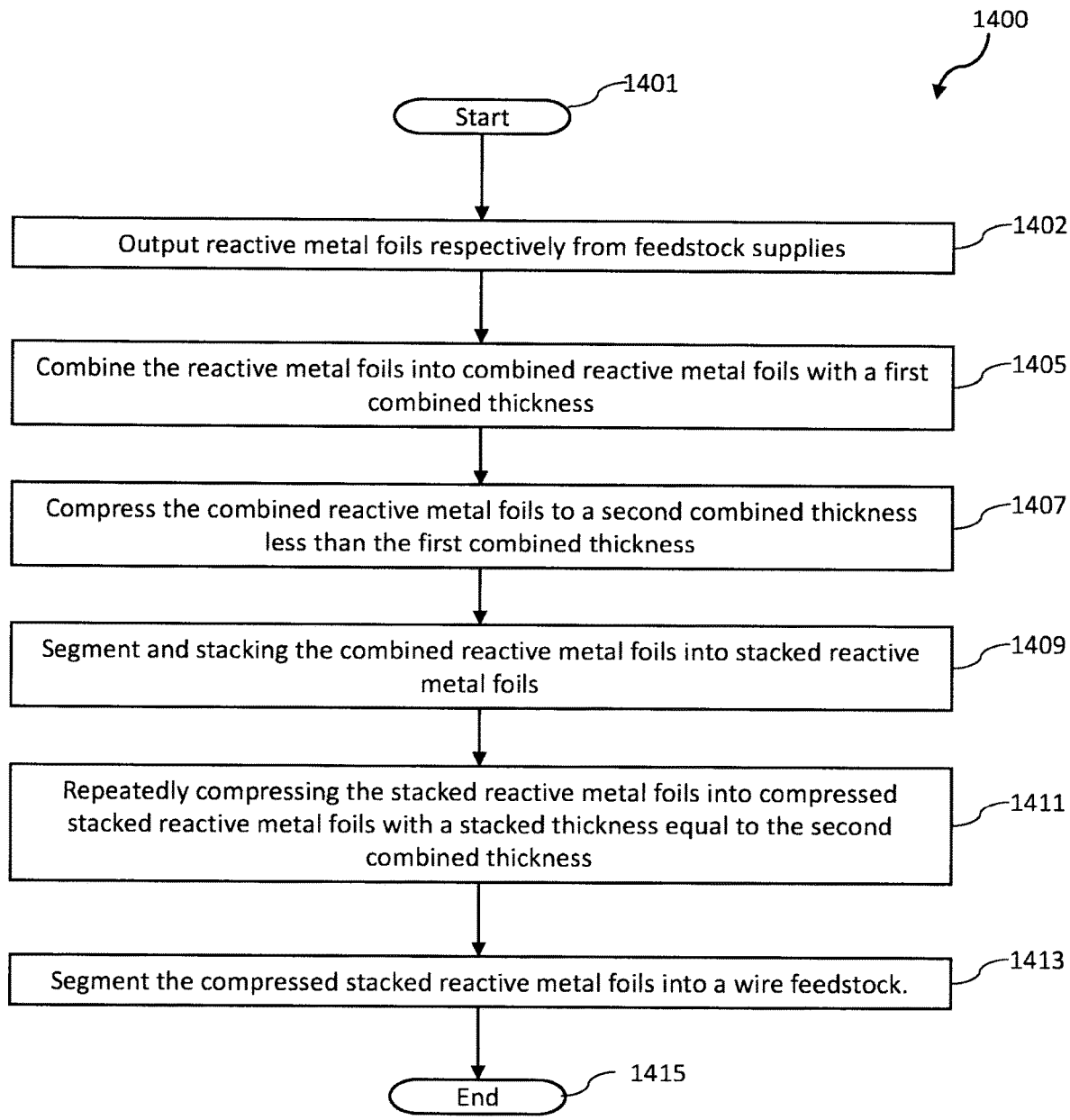
FIG. 19 is a flowchart for a method for making an additive manufacturing feedstock, according to the present disclosure.

Referring now to FIG. 19, a method for making an additive manufacturing feedstock according to the present disclosure is now described with reference to a flowchart 1400, which begins at Block 1401. The method comprises outputting a plurality of reactive metal foils 102a-102d respectively from a plurality of feedstock supplies 101a-101d (Block 1402), and combining the plurality of reactive metal foils into a combined plurality of reactive metal foils 105 with a first combined thickness (Block 1405). The method further includes compressing the combined plurality of reactive metal foils 105 to a second combined thickness less than the first combined thickness (Block 1407), segmenting and stacking the combined plurality of reactive metal foils into a stacked plurality of reactive metal foils 110 (Block 1409), and repeatedly compressing the stacked plurality of reactive metal foils into a compressed stacked plurality of reactive metal foils 111 with a stacked thickness equal to the second combined thickness (Block 1411). The method also includes segmenting the compressed stacked plurality of reactive metal foils 111 into a wire feedstock 113 (Block 1413). The method ends at Block 1415.

Figure 3:
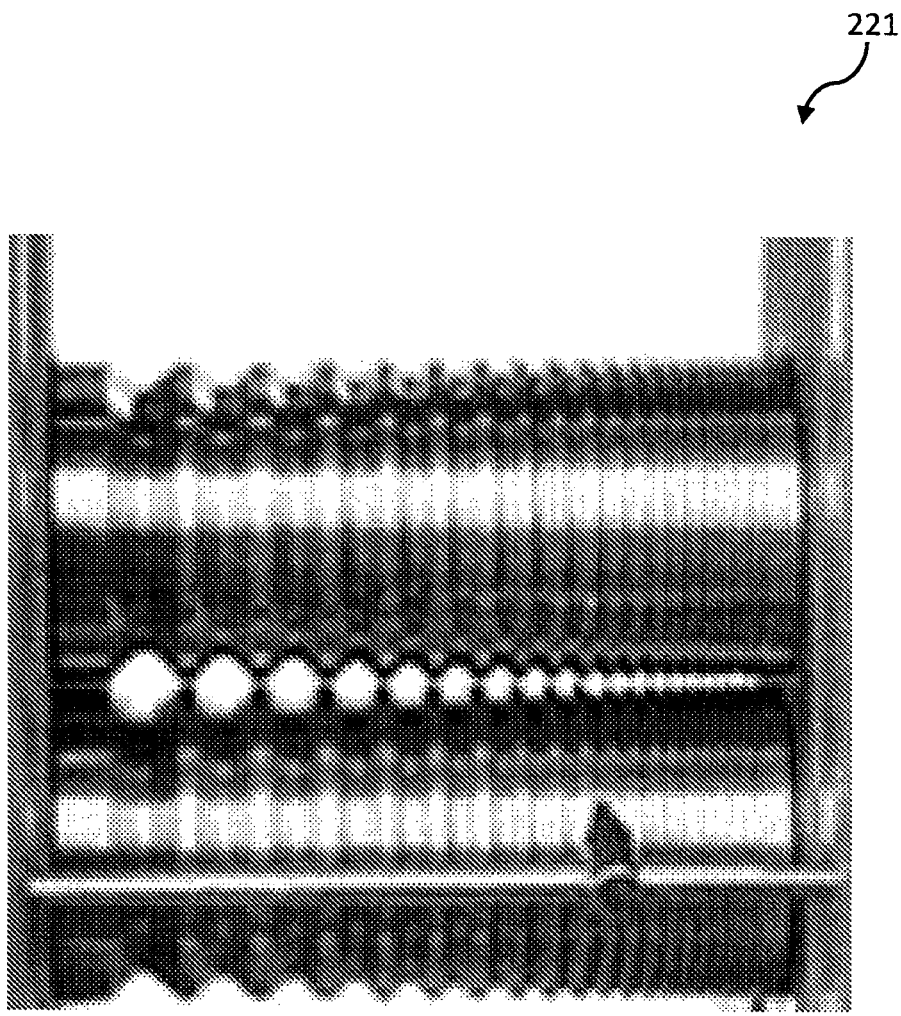
FIG. 3 is an image of a grooved roller mill for compaction of an output of the additive manufacturing feedstock production system of FIG. 2.

Referring now additionally to FIGS. 2-3, another embodiment of the additive manufacturing feedstock production system 200 is now described. In this embodiment of the additive manufacturing feedstock production system 200, those elements already discussed above with respect to FIG. 1 are incremented by 100 and most require no further discussion herein. This embodiment differs from the previous embodiment in that this additive manufacturing feedstock production system 200 illustratively includes a processing module 220 configured to stack and roll the plurality of reactive metal foils 202a-202d into a rolled plurality of reactive metal foils defining a rod 221. Then, the rod 221 is fed through the groove spaces on a work groove roller 222 from a large diameter to a small diameter, shown in FIG. 3, until the desired specific contact area is reached so that the self-propagation reaction can happen. The rod 221 is used as the reactive feedstock for additive manufacturing process.

Referring now additionally to FIG. 4, an additive manufacturing device 300 is now described. The additive manufacturing device 300 illustratively comprises a wire feeding roller 301 configured to receive reactive feedstock 302. For example, the reactive feedstock 302 may be manufactured by the additive manufacturing feedstock production systems 200, 300. The additive manufacturing device 300 also comprises a preheating unit 303 configured to preheat the reactive feedstock 302 downstream from the wire feeding roller 301, and a nozzle 304 downstream from the preheating unit and configured to dispense the material 305 on a printing platform 306. The additive manufacturing device 300 illustratively comprises a reaction initiation unit 307 (e.g., a laser, a resistive heating basket) configured to irradiate the material 305 with an energy burst.

Referring now to FIGS. 5A-5D, an image 1010 of an exemplary embodiment of an additive manufacturing device 300 is shown. An image 1020 shows reactive feedstock with different sizes. An image 1030 shows a time-resolved reaction of the reactive feedstock, during printing. An image 1040 shows a printed wall structure produced by the exemplary embodiment of the additive manufacturing device 300.

Figure 6A:
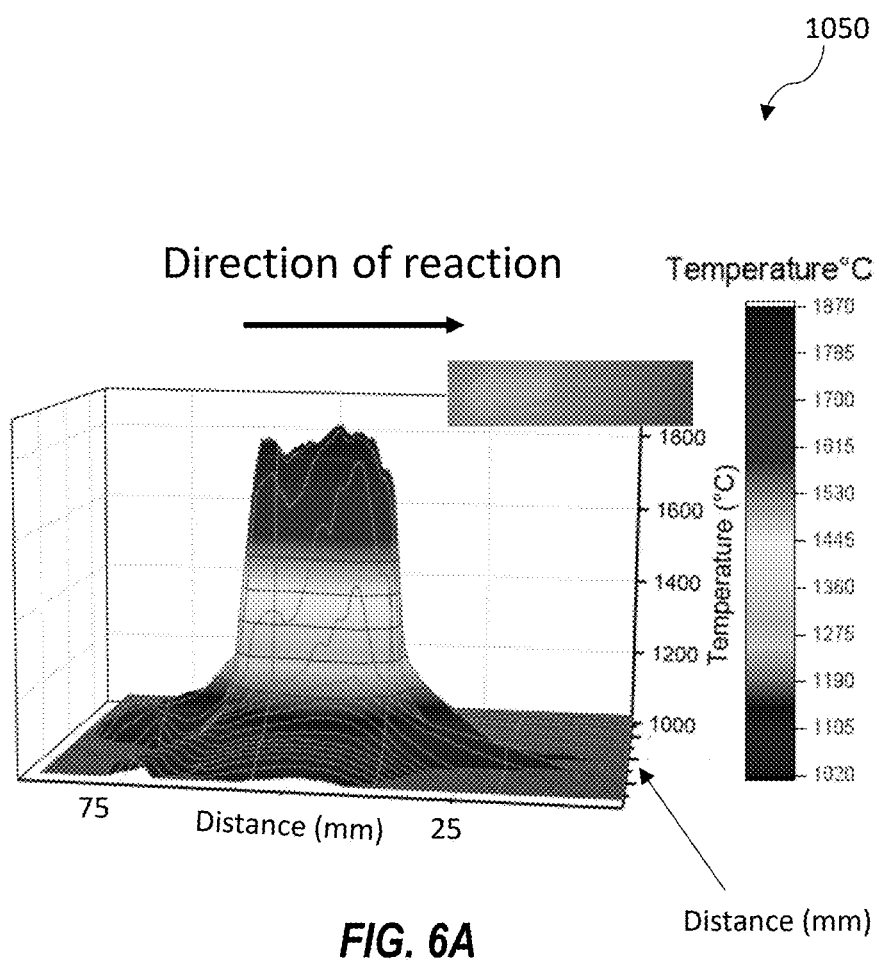
FIGS. 6A and 6B are diagrams of temperature mapping of reacting feedstock, and reaction front temperature/reaction front propagation speed, respectively, according to the present disclosure.
Figure 6B:
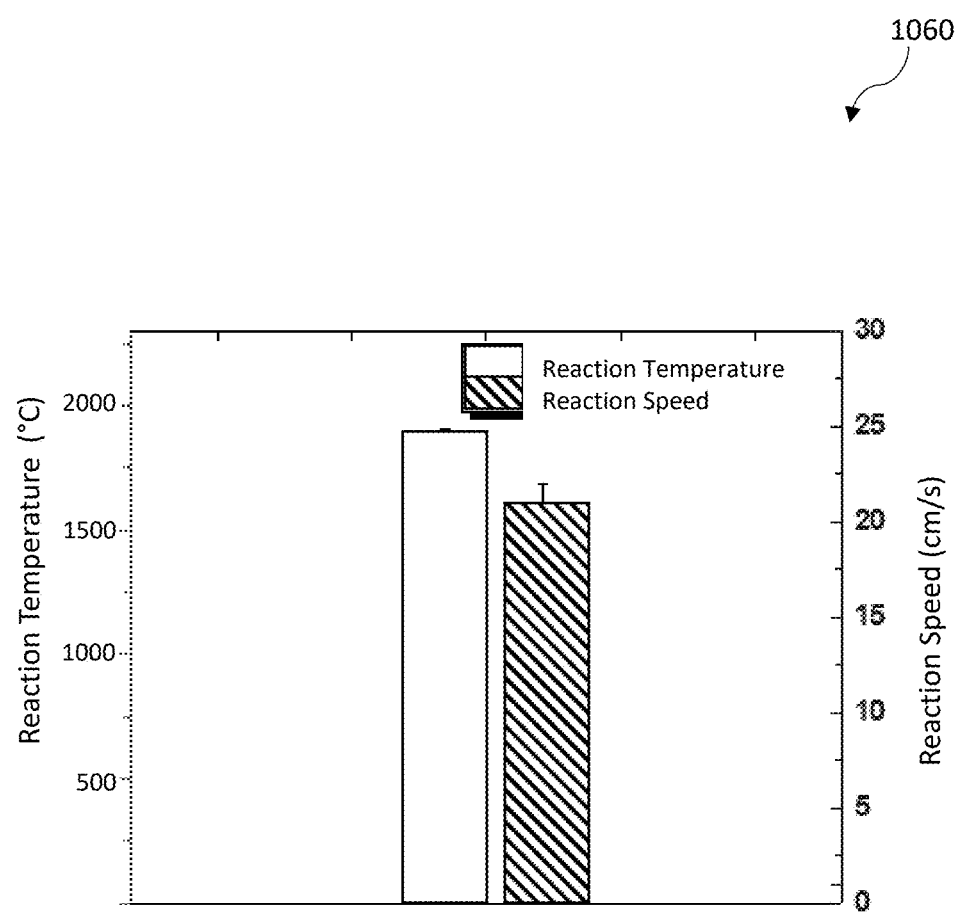
Figure 7A:
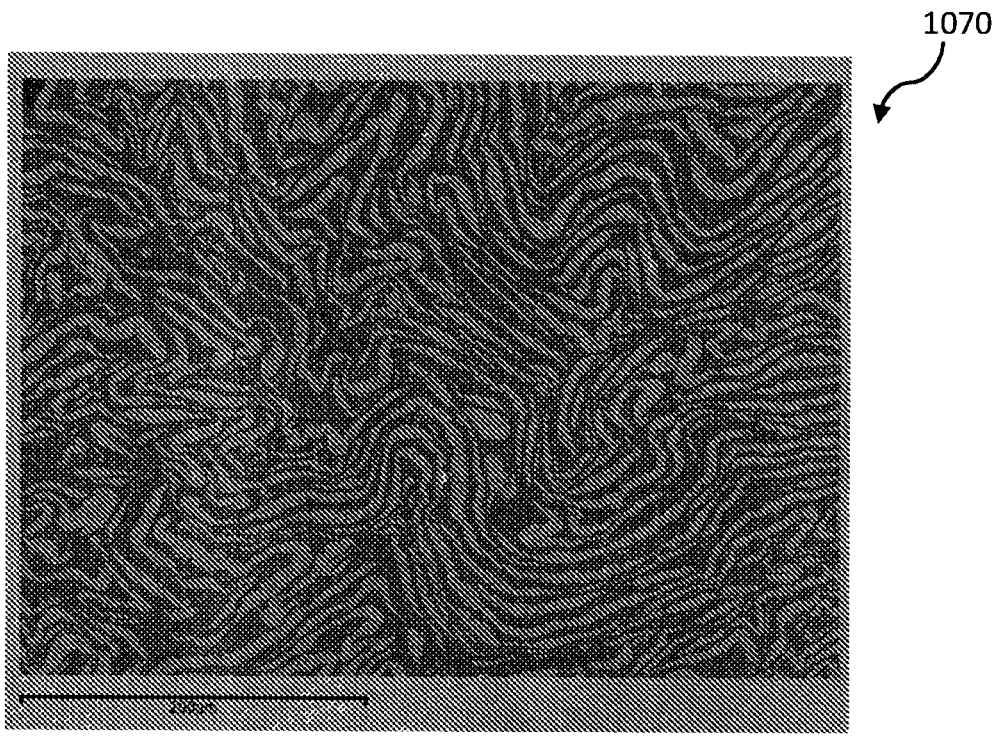
FIGS. 7A-7D are an image and elemental mappings of reactive feedstock cross-section, respectively, according to the present disclosure.
Figure 7B:
Figure 7C:
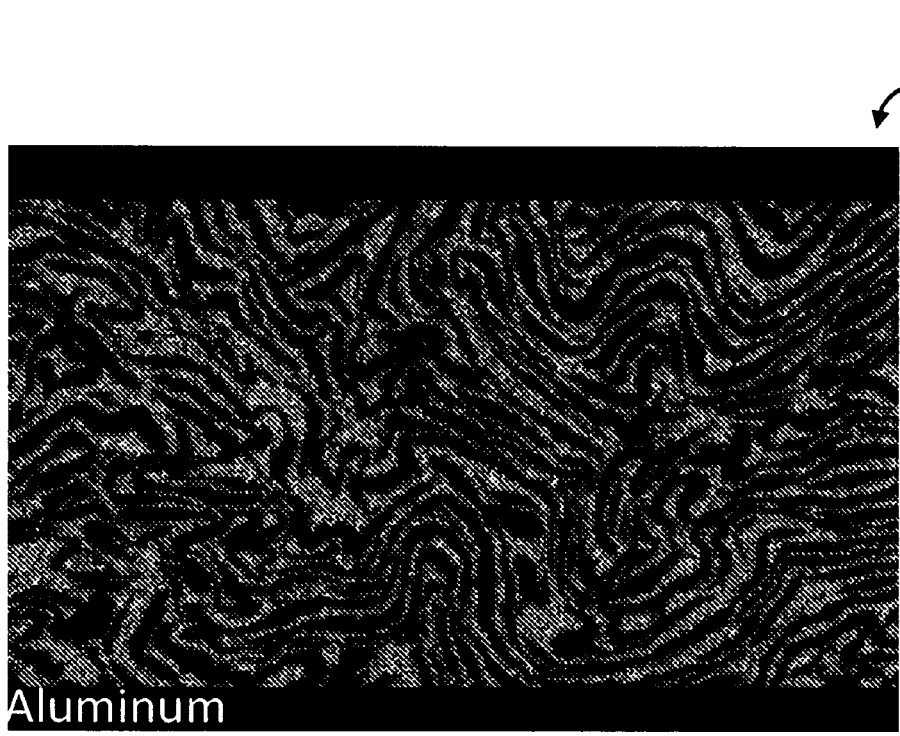
Figure 7D:
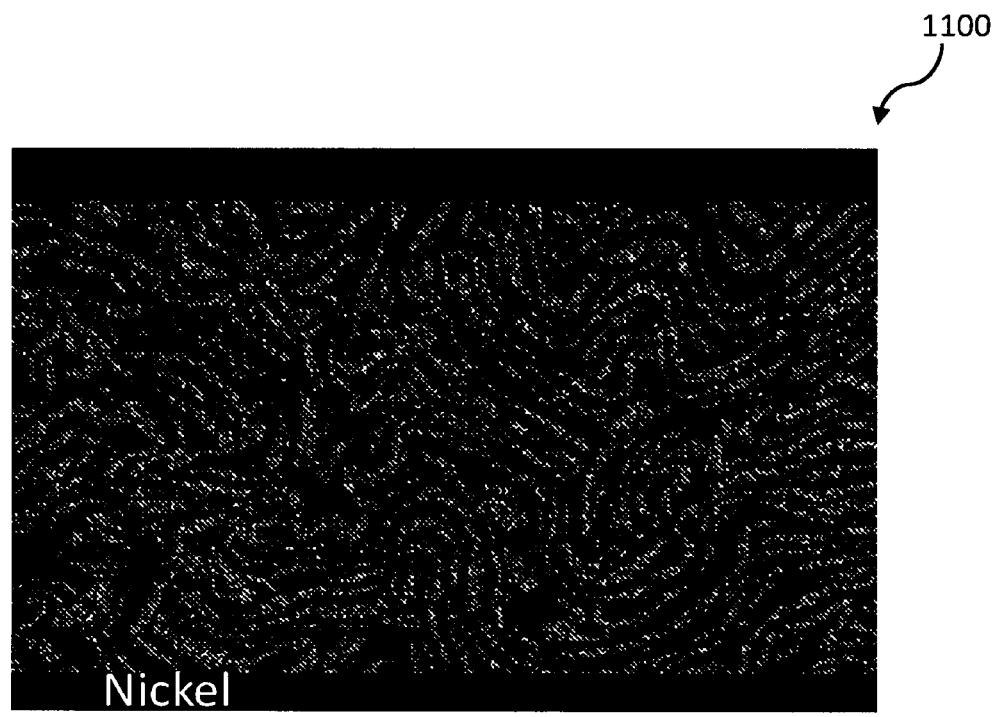
Figure 8A:
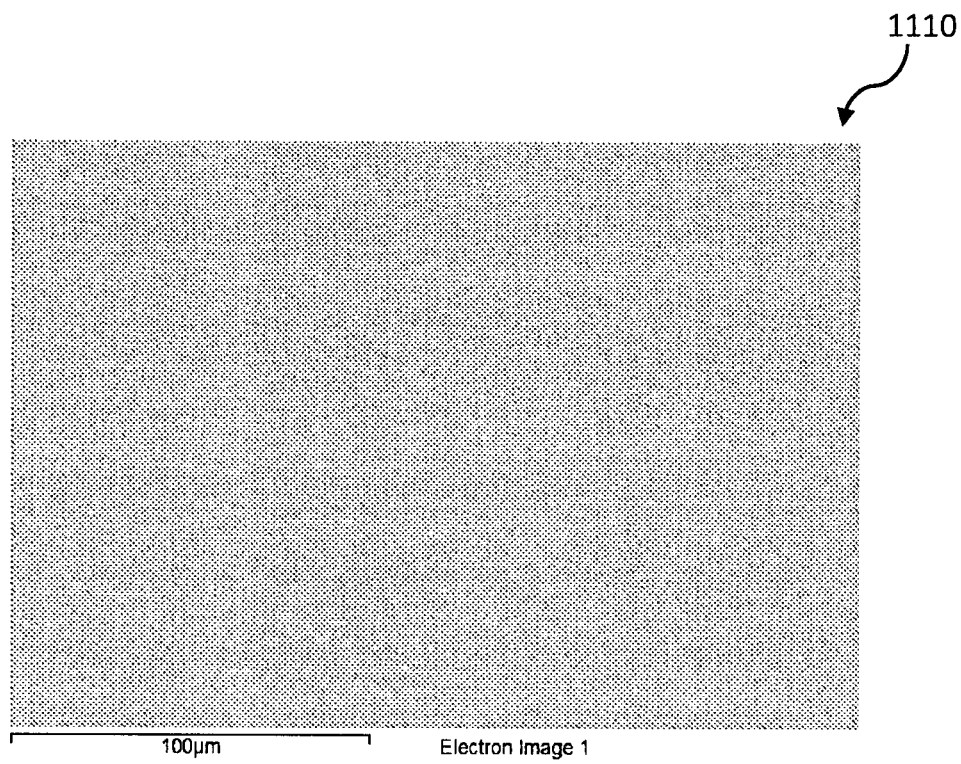
FIGS. 8A-8D are an image and elemental mappings of the printed part cross-section, respectively, according to the present disclosure.
Figure 8B:
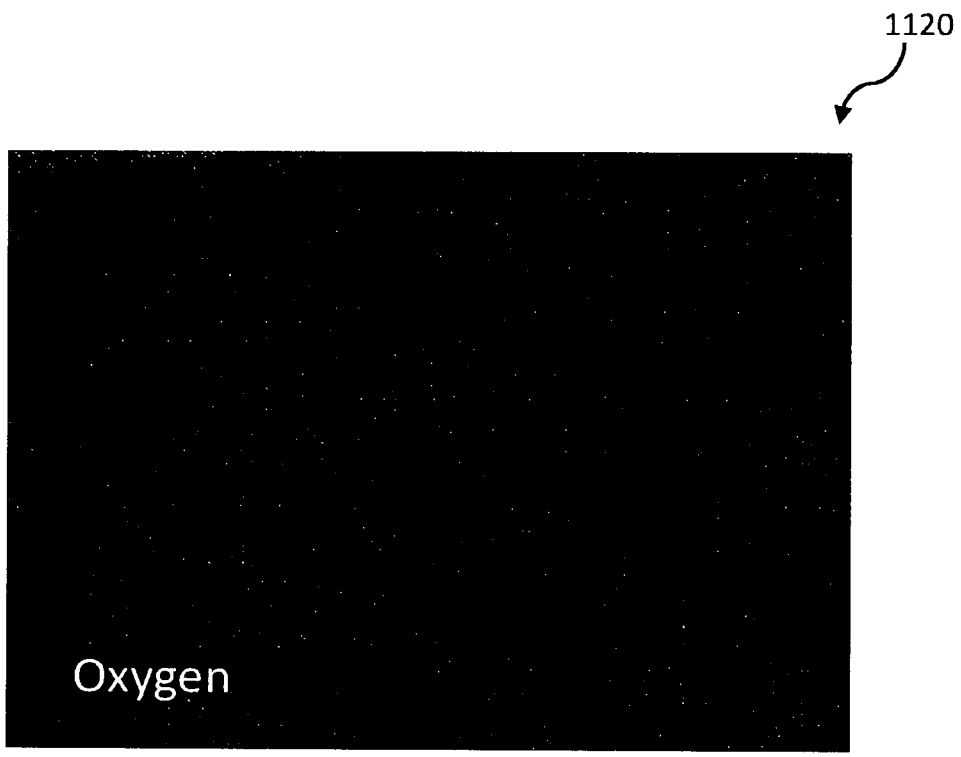
Figure 8C:
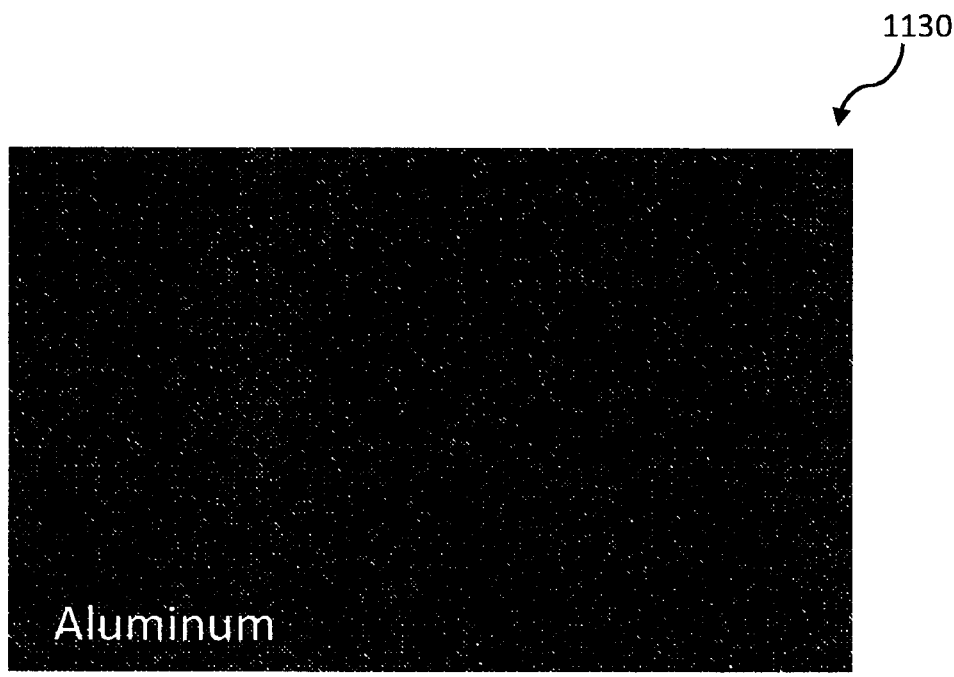
Figure 8D:

Referring now to FIGS. 6A-6B, a diagram 1050 shows temperature mapping of the reacting feedstock, and a diagram 1060 shows reaction front temperature and reaction front propagation speed. Referring now to FIGS. 7A-7D, images 1070, 1080, 1090, 1100 show a scanning electron microscope (SEM) cross-section of the reactive feedstock, and energy-dispersive X-ray spectroscopy (EDS) scans for oxygen, aluminum, and nickel, respectively. Referring now to FIGS. 8A-8D, images 1110, 1120, 1130, 1140 show an SEM cross-section of the printed part, and EDS scans for oxygen, aluminum, and nickel, respectively.

Figure 9:
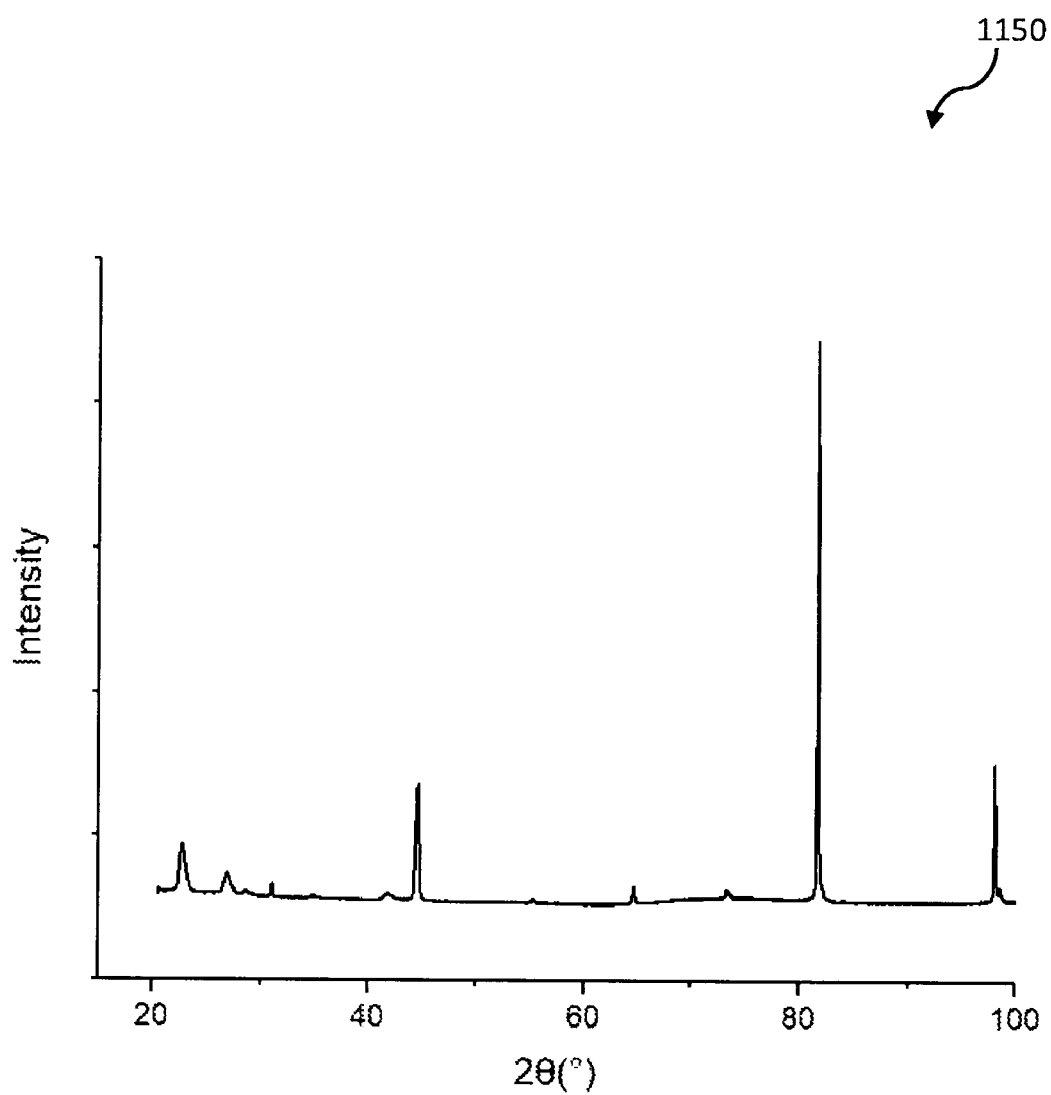
FIG. 9 is a diagram of an analysis of a printed structure, according to the present disclosure.
Figure 10A:
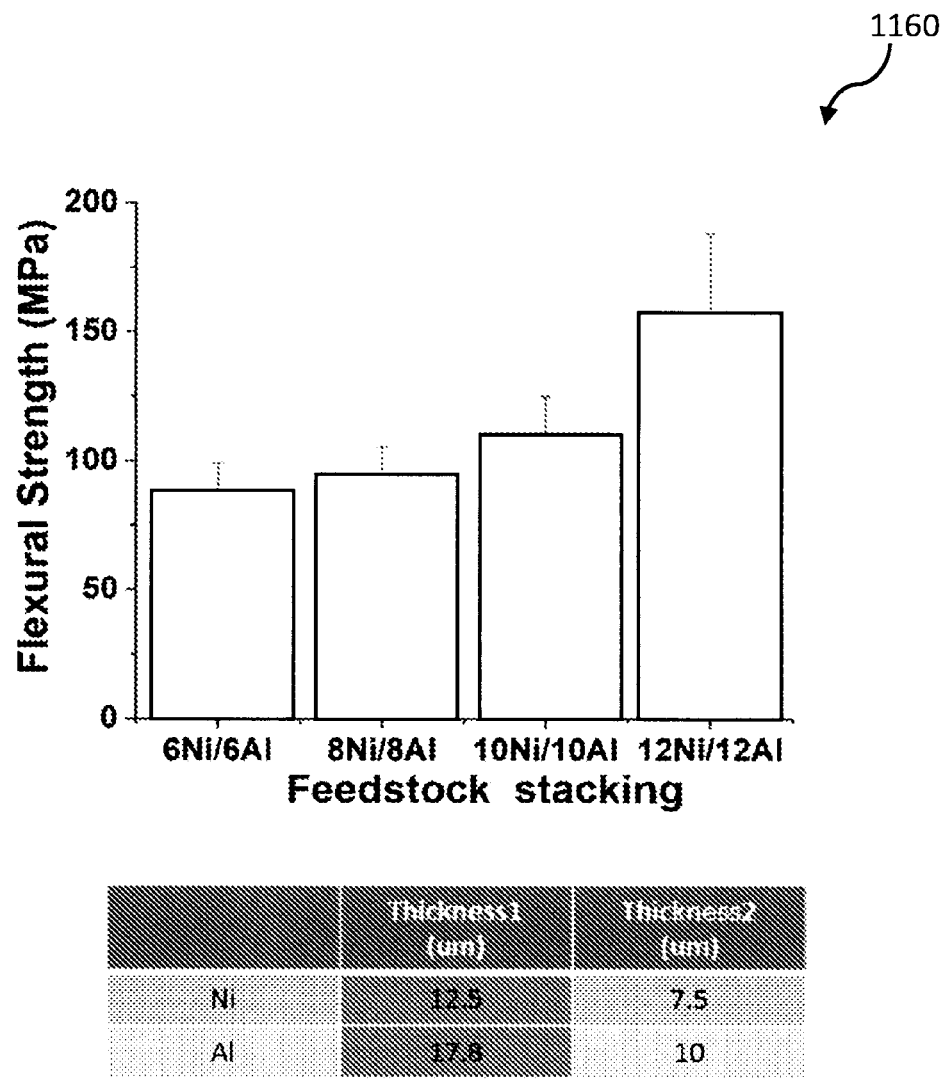
FIGS. 10A and 10B are diagrams of flexural strength of reactive feedstock with different number of foils and different foil thicknesses, according to the present disclosure.
Figure 10B:
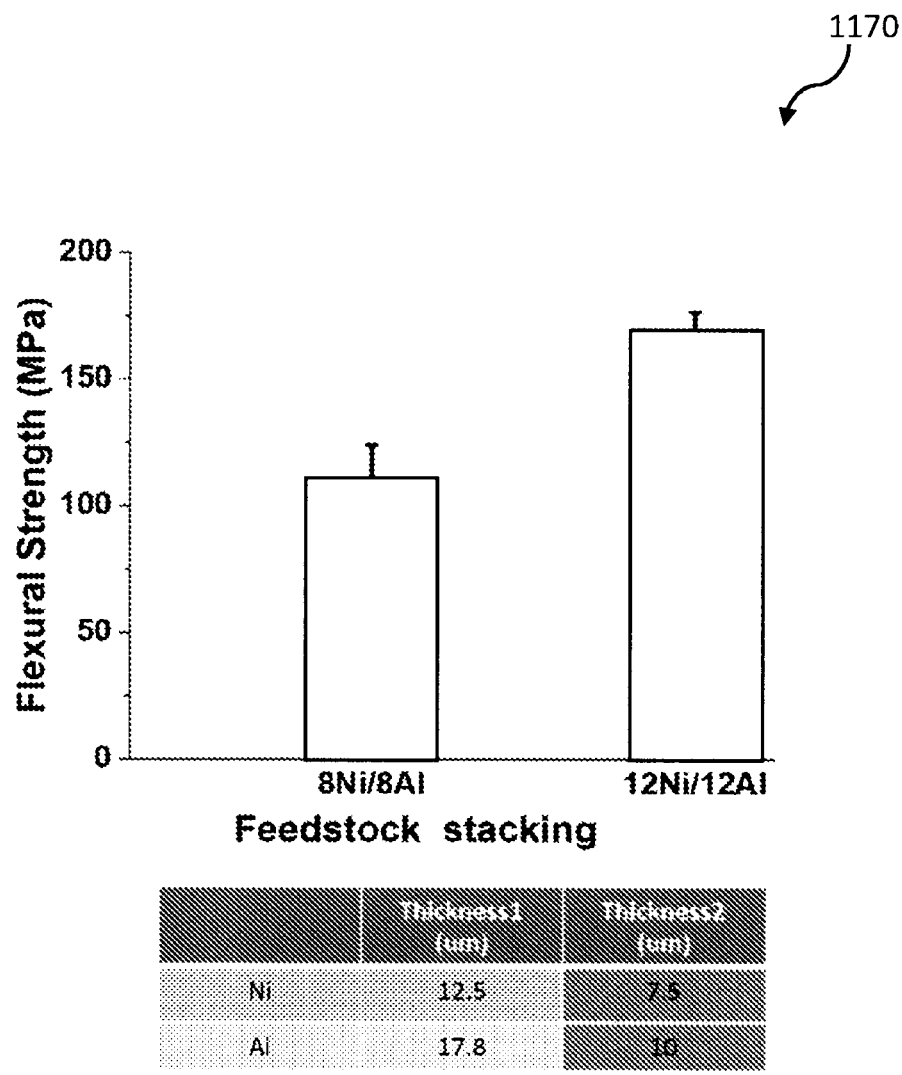

FIG. 9 includes a diagram 1150 of X-ray diffraction (XRD) analysis of the printed structure. Referring now to FIGS. 10A-10B, diagrams 1160, 1170 show flexural strength of reactive feedstock with different number of foils, respectively nickel foil thickness 12.5 µm/aluminum foil thickness 17.8 µm, and nickel foil thickness 7.5 µm/aluminum foil thickness 10 µm.

Figure 11A:
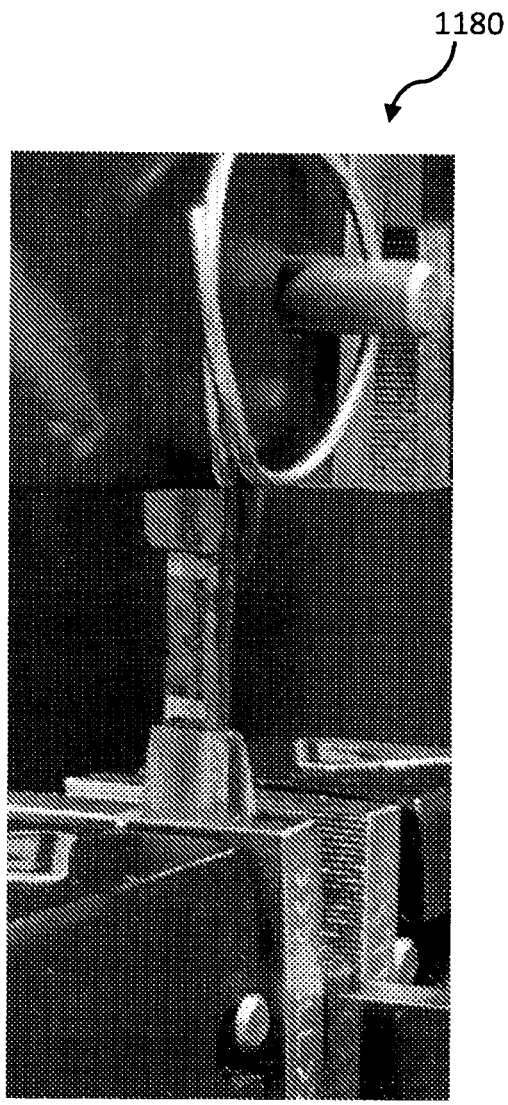
FIGS. 11A and 11B are images of tensile strength of printed specimen before and after the tensile test, respectively, according to the present disclosure.
Figure 11B:
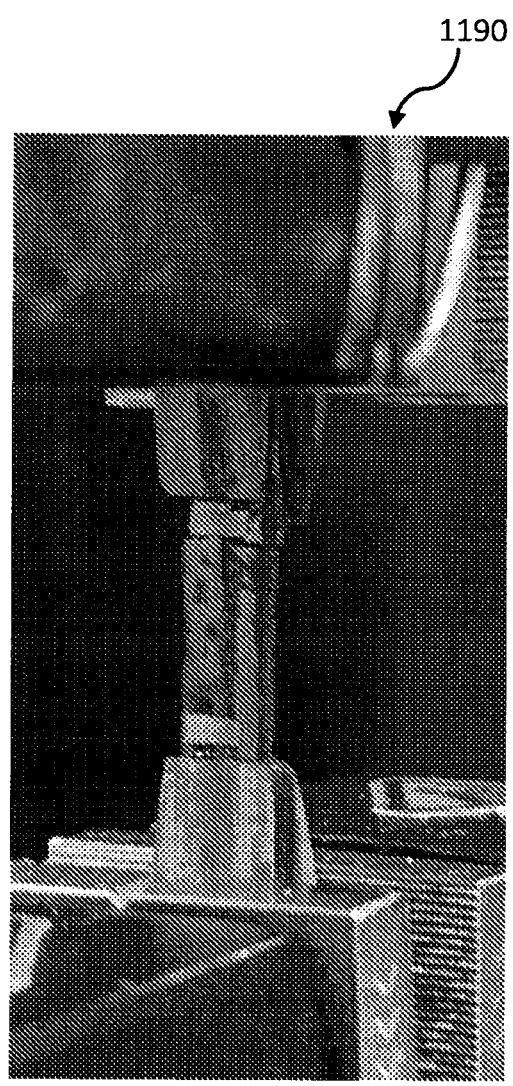
Figure 12A:
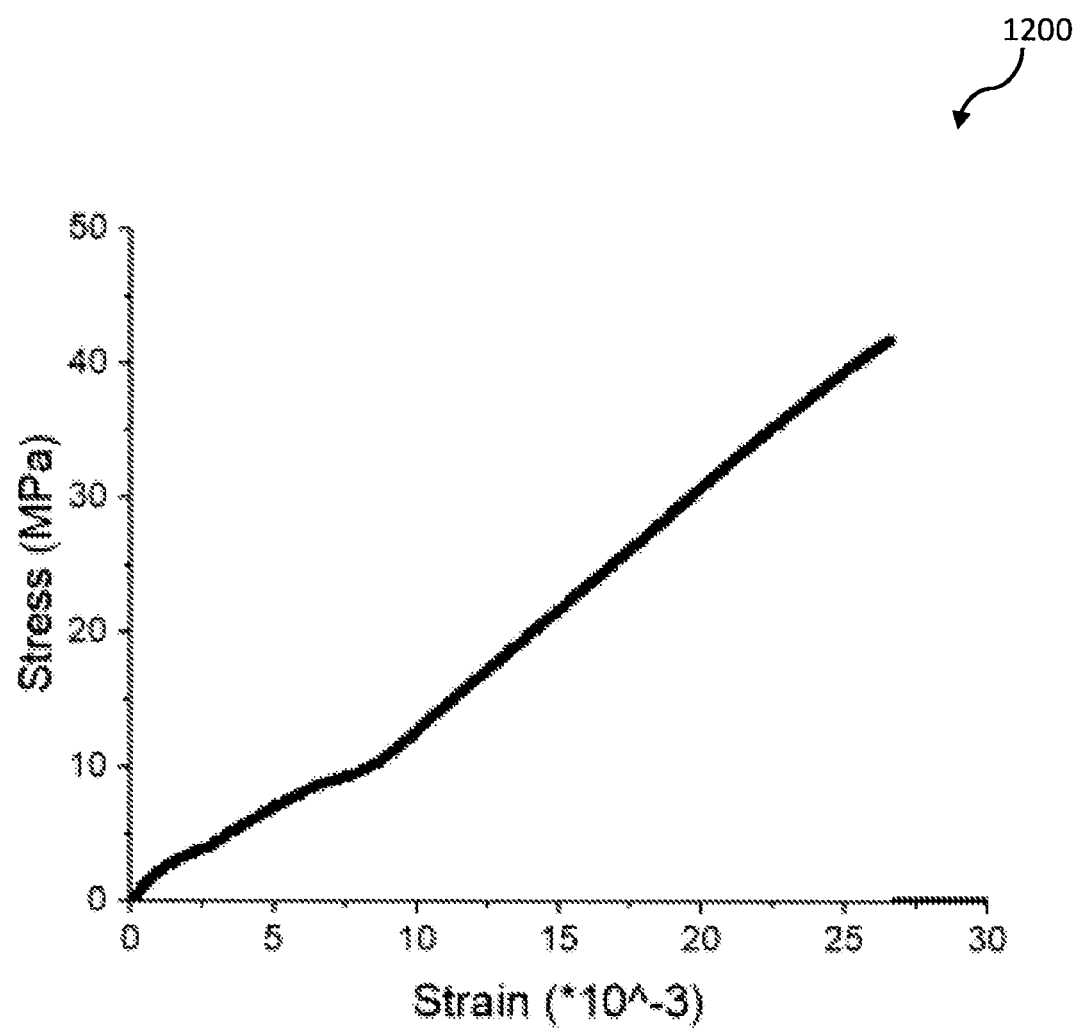
FIG. 12A is a diagram of a stress-strain curve for a printed specimen, according to the present disclosure.
Figure 12B:
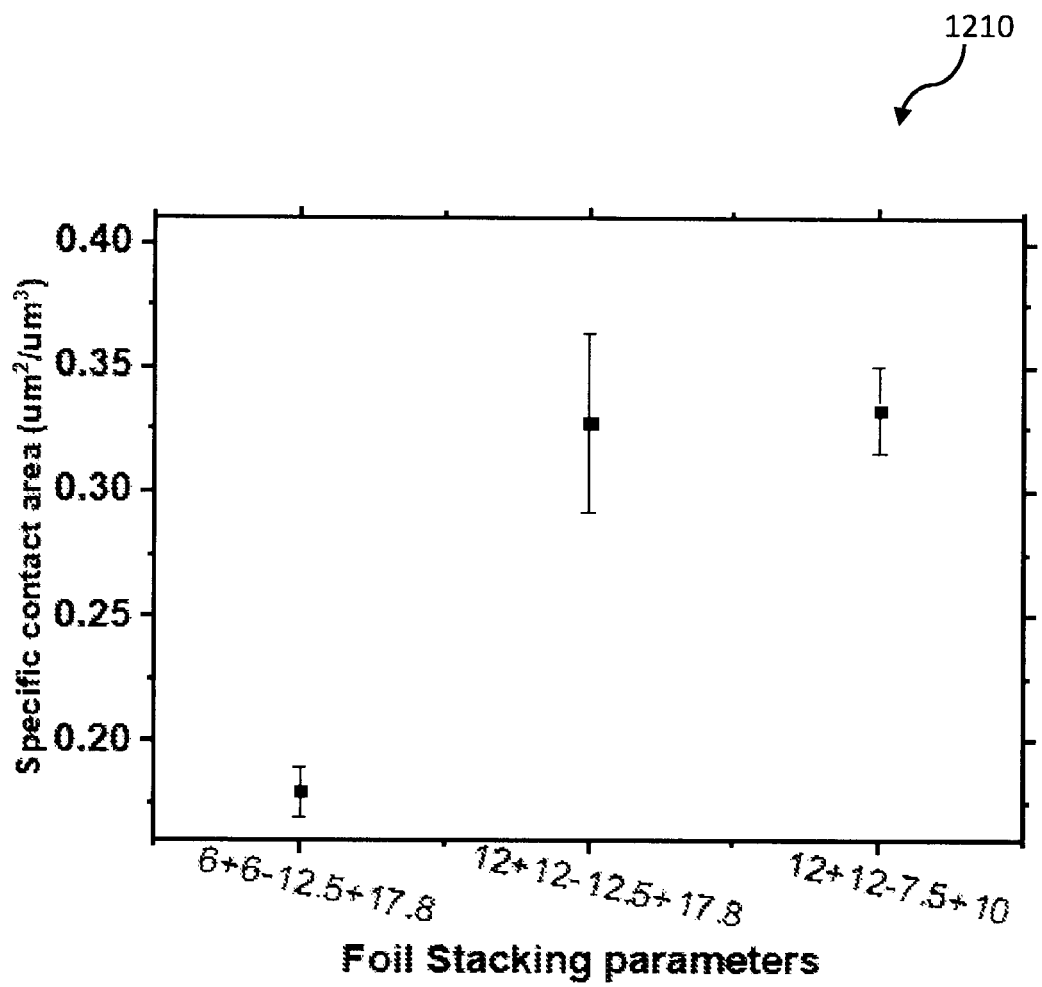
FIG. 12B is a diagram of specific contact area between reactive foils of reactive feedstocks, according to the present disclosure.
Figure 12C:
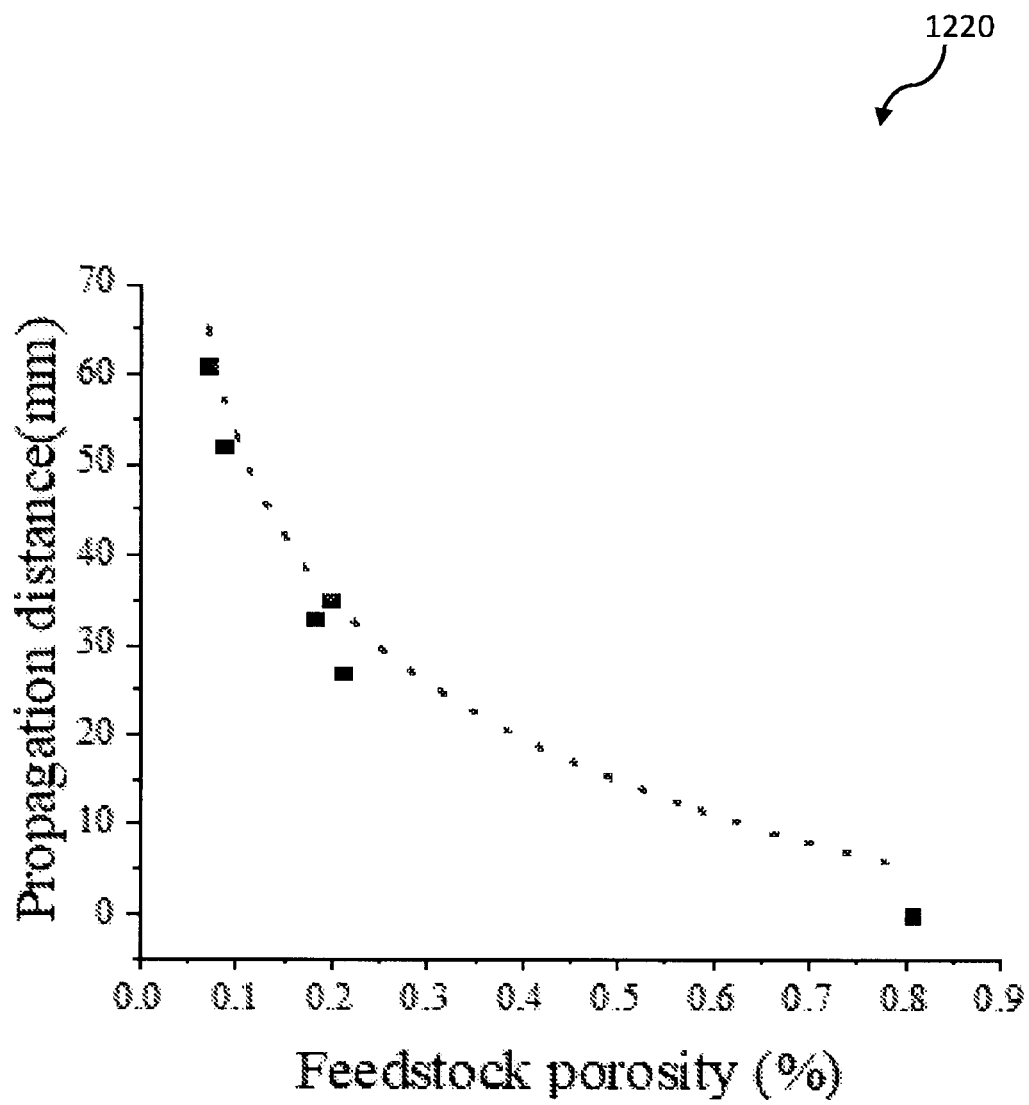
FIG. 12C is a diagram of effect of feedstock porosity on reaction propagation distance, according to the present disclosure.
Figure 12D:
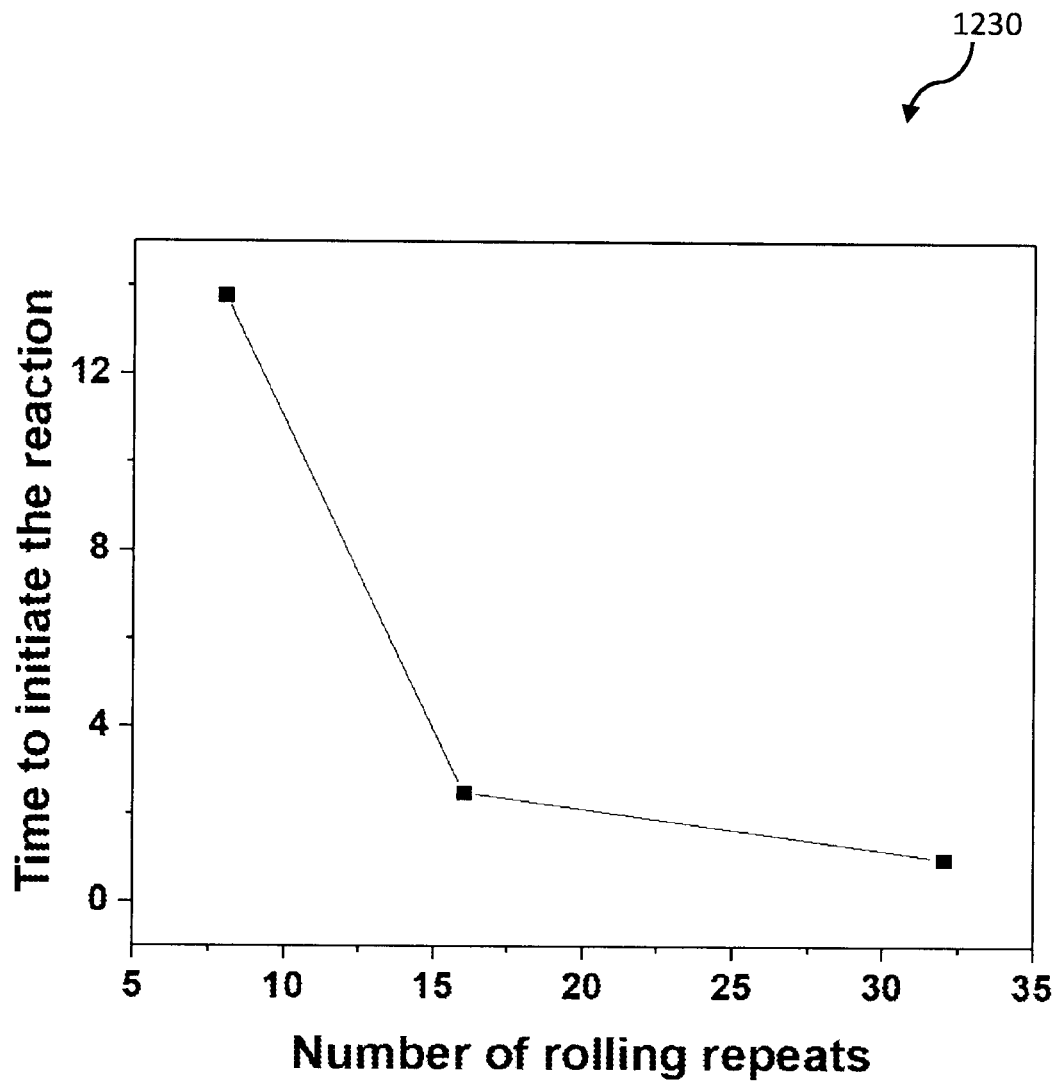
FIG. 12D is a diagram of effect of rolling compaction on initiation of the feedstock reaction, according to the present disclosure.

Referring now to FIGS. 11A-11B, images 1180, 1190 show tensile strength of printed specimen before and after the tensile test. Referring now to FIGS. 12A-12D, a diagram 1200 shows a stress-strain curve for the printed part; a diagram 1210 shows specific contact area between reactive foils of reactive feedstocks; a diagram 1220 shows effect of feedstock porosity on reaction propagation distance; and a diagram 1230 shows effect of rolling compaction on initiation of the feedstock reaction.

Figure 13A:
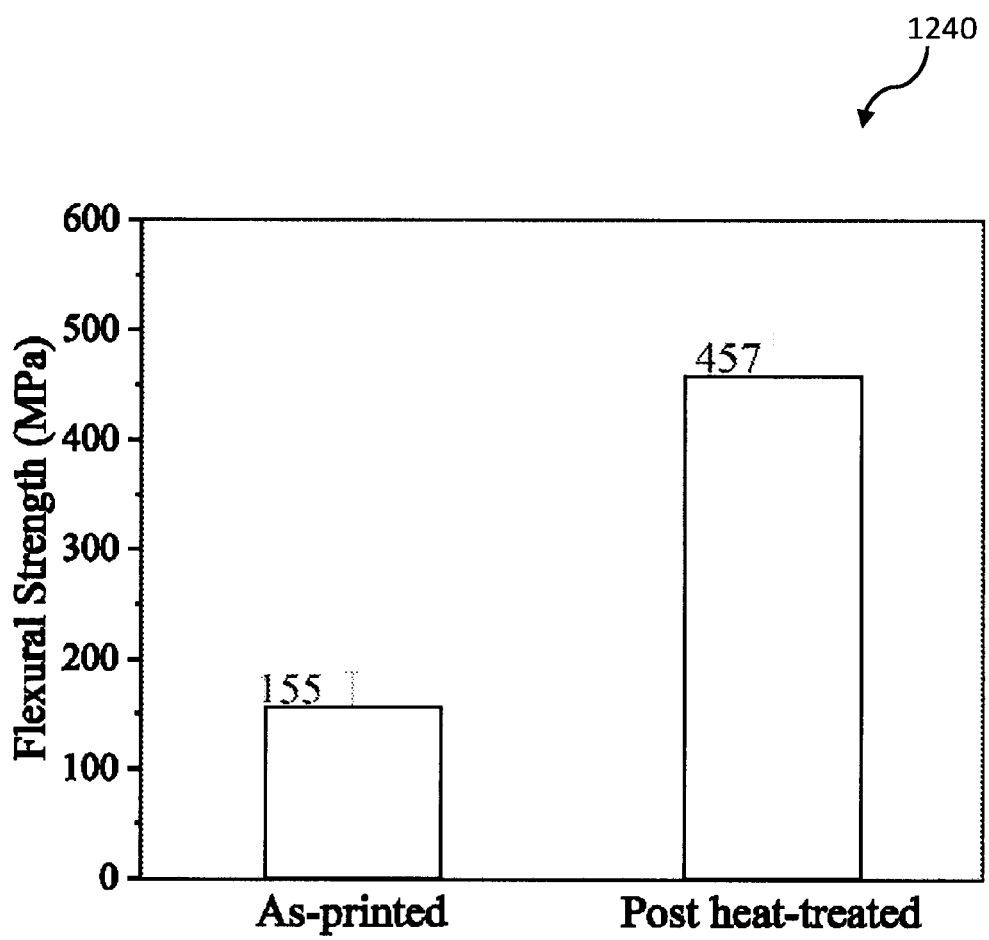
FIG. 13A is a diagram of flexural strength in a manufactured specimen, according to the present disclosure.
Figure 13B:
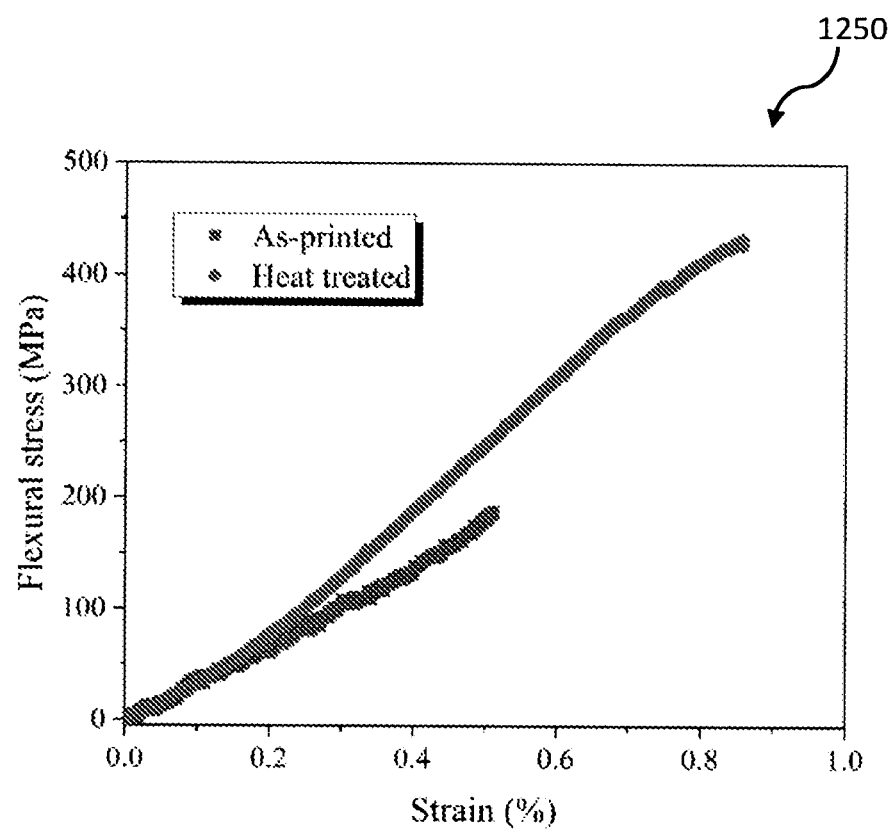
FIG. 13B is a diagram of flexural stress in the manufactured specimen, according to the present disclosure.

Referring now to FIGS. 13A-13B, a diagram 1240 shows flexural strength in the manufactured specimen with post-printing heat treatment, and a diagram 1250 shows flexural stress in the manufactured specimen with post-printing heat treatment. The heat treatment was performed at 1100° C. in argon environment for 6 hours. The result shows that post-printing heat treatment can significantly boost the mechanical performance of the printed structure.

Figure 14A:
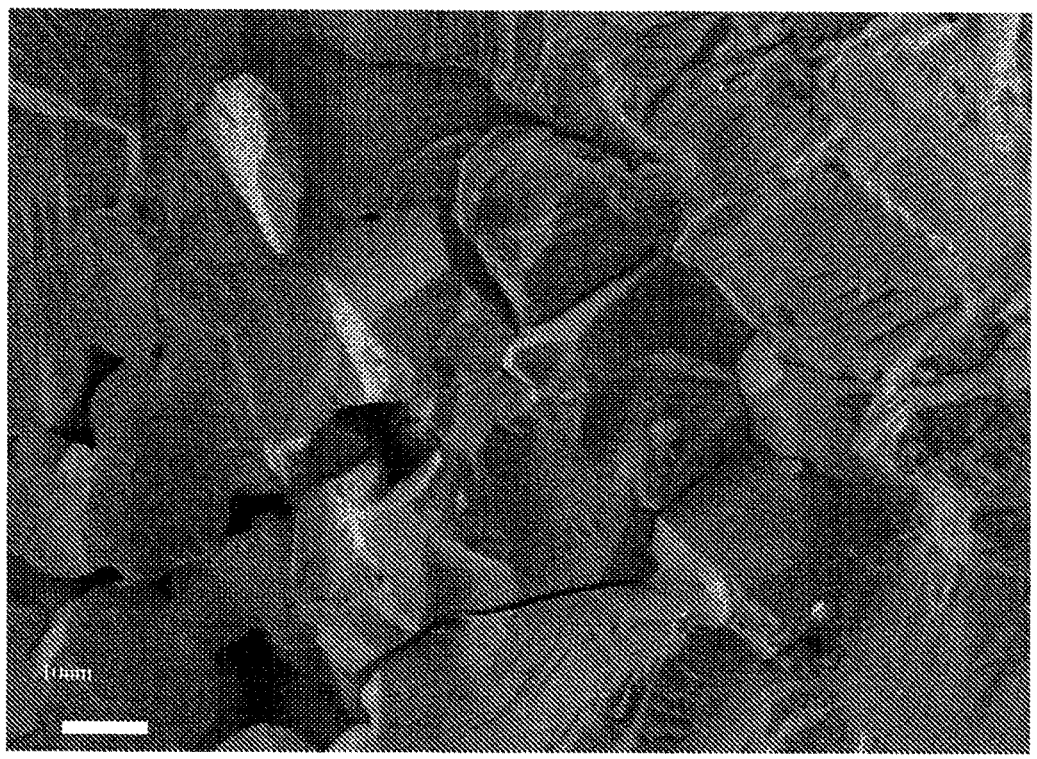
FIGS. 14A and 14B are images of fracture surfaces from the flexural test of the manufactured specimen before and after heat treatment, respectively, according to the present disclosure.
Figure 14B:
Figure 15:
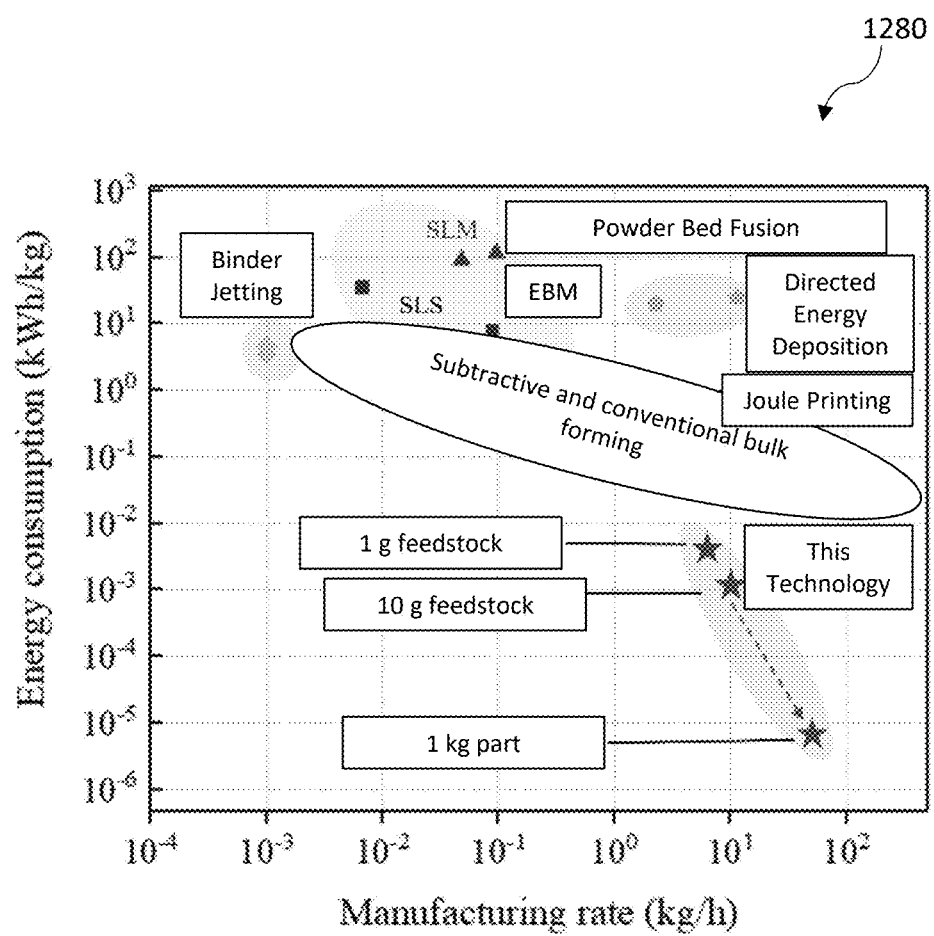
FIG. 15 is a diagram of manufacturing rate and energy consumption of the manufactured specimen, according to the present disclosure, as compared to typical current metal additive manufacturing methods.

FIGS. 14A and 14B include images 1260, 1270 of fracture surfaces from the flexural test of the manufactured specimen before and after post-printing heat treatment. As shown, the post-printing heat treatment reduced the number of surface fractures. FIG. 15 includes a diagram 1280 of manufacturing rate and energy consumption of the manufactured specimen as compared to typical current metal additive manufacturing methods. The reactive metal additive manufacturing may also be implemented by powder based feedstock.

Figure 16:
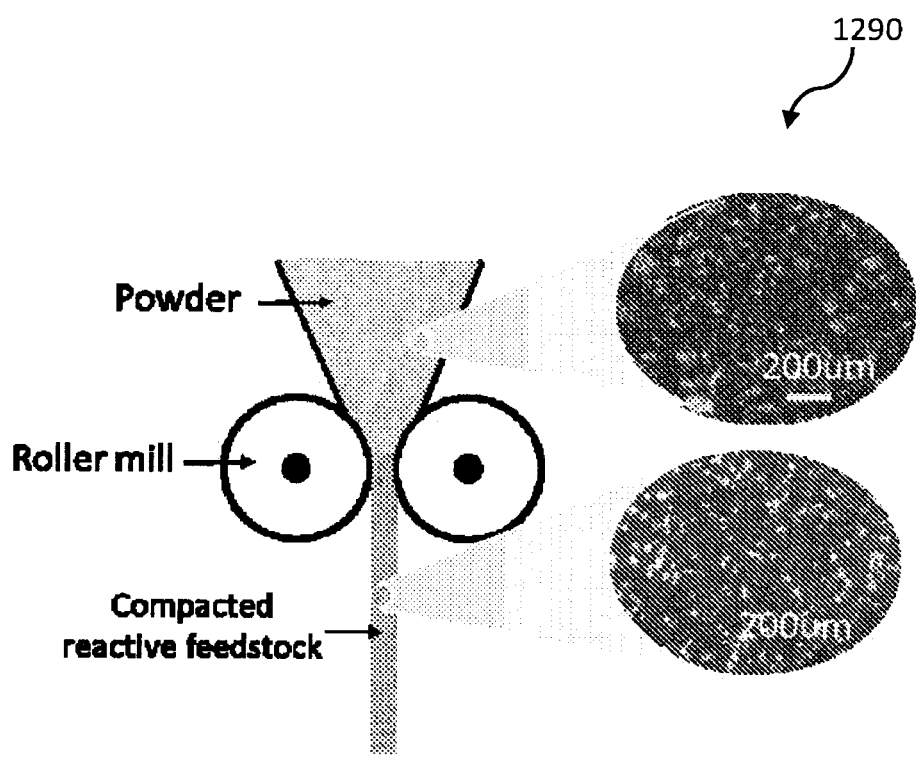
FIG. 16 is a schematic diagram of a method for preparation of reactive powder-based feedstock, according to the present disclosure.
Figure 17:
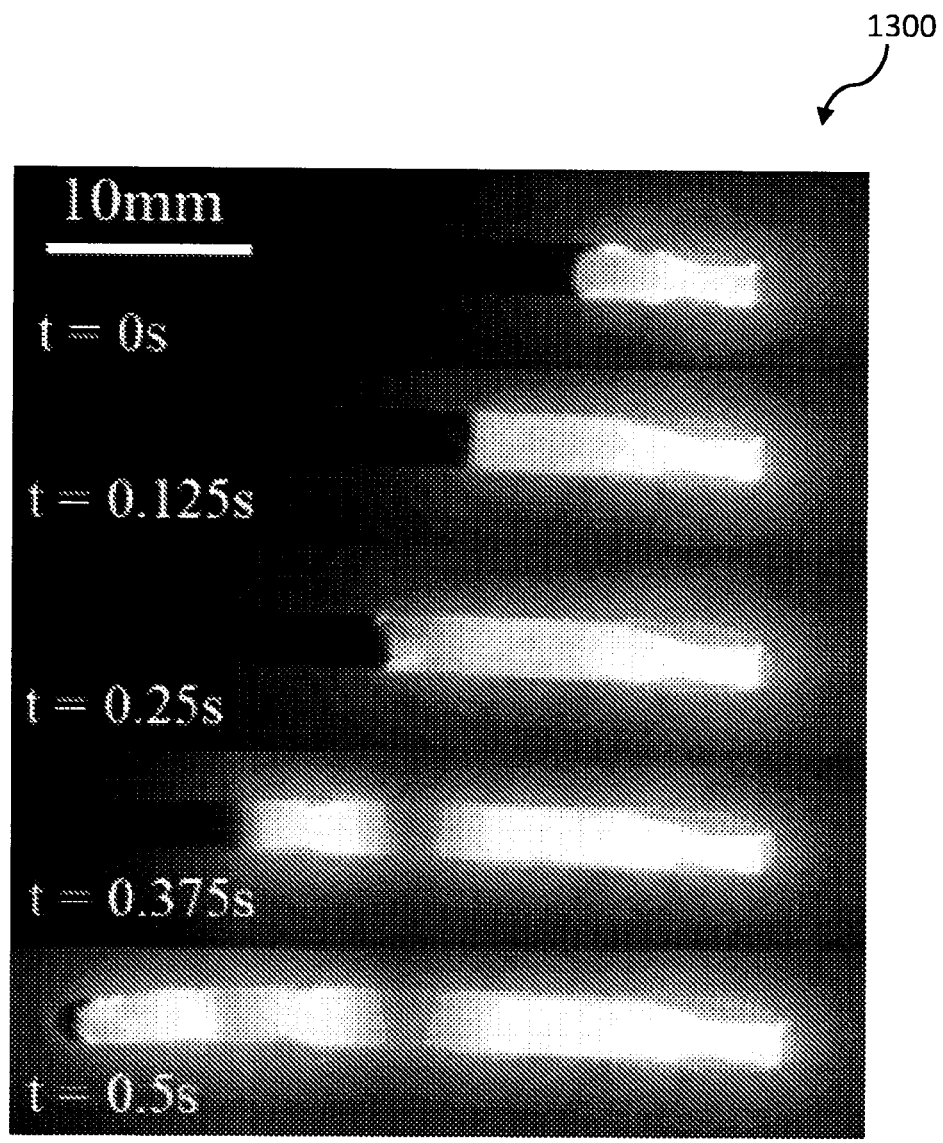
FIG. 17 are time resolved images of the powder-based feedstock self-sustaining reaction, according to the present disclosure.
Figure 18:
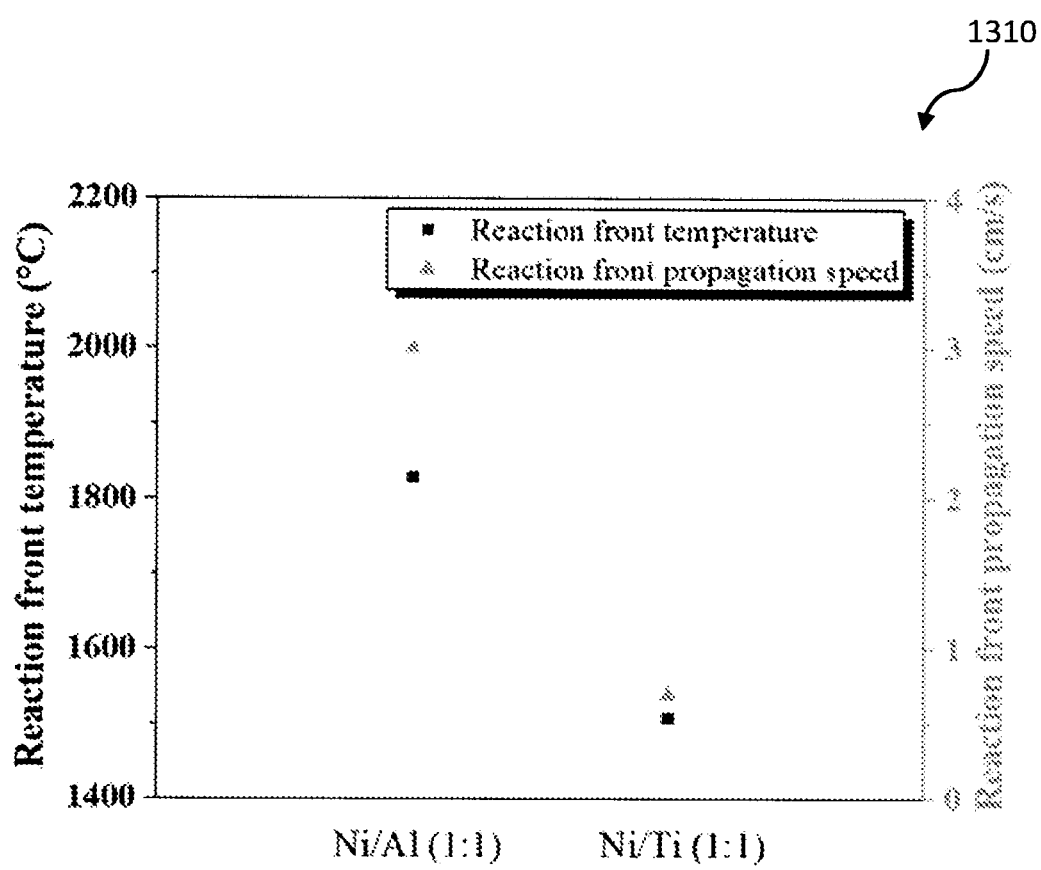
FIG. 18 is a diagram of reaction front temperature, according to the present disclosure.

FIGS. 16-18 includes a diagram 1290 of a method for preparation of reactive powder-based feedstock. The reactive powder combinations are first homogeneously mixed and then compacted through roller milling. The possible combination includes aluminum/nickel and aluminum/titanium powders. The powder-based feedstock is reactive with a self-sustaining reaction wave, once triggered by an initial thermal energy input (e.g., using a torch or heating element). The reaction images of nickel/aluminum combination are shown in FIG. 17, which shows a time resolved image 1300 of the powder-based feedstock self-sustaining reaction. Characteristics of both nickel/aluminum and nickel/titanium combinations are shown in a diagram 1310, which shows reaction front temperature of the reactive powder-based feedstock.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An additive manufacturing feedstock production system comprising:
   a plurality of feedstock supplies configured to respectively output a plurality of reactive metal foils;
   a transition roller downstream from the plurality of feedstock supplies and configured to combine the plurality of reactive metal foils into a combined plurality of reactive metal foils with a first combined thickness;
   a pre-treater upstream of the transition roller and configured to remove surface contaminants from the plurality of reactive metal foils;
   a work roller downstream from the transition roller and configured to compress the combined plurality of reactive metal foils to a second combined thickness less than the first combined thickness;
   an additional roller downstream from the work roller;
   a first mechanical processor downstream from the work roller and configured to
      segment and stack the combined plurality of reactive metal foils into a stacked plurality of reactive metal foils, and
      feed the stacked plurality of reactive metal foils into the work roller;
   the work roller configured to repeatedly compress the stacked plurality of reactive metal foils into a compressed stacked plurality of reactive metal foils with a stacked thickness equal to the second combined thickness and until a specific contact area metric threshold is exceeded; and
   a second mechanical processor configured to segment the compressed stacked plurality of reactive metal foils into a wire feedstock.

2. The additive manufacturing feedstock production system of claim 1 wherein the specific contact area metric threshold is greater than 0.20 $\mu m^2/\mu m^3$; and wherein each of the plurality of reactive metal foils has a thickness in a range of 5-20 $\mu m$.

3. A method for making an additive manufacturing feedstock, the method comprising:
   outputting a plurality of reactive metal foils respectively from a plurality of feedstock supplies;
   combining the plurality of reactive metal foils into a combined plurality of reactive metal foils with a first combined thickness;
   compressing the combined plurality of reactive metal foils to a second combined thickness less than the first combined thickness;
   segmenting and stacking the combined plurality of reactive metal foils into a stacked plurality of reactive metal foils;
   repeatedly compressing the stacked plurality of reactive metal foils into a compressed stacked plurality of reactive metal foils with a stacked thickness equal to the second combined thickness; and
   segmenting the compressed stacked plurality of reactive metal foils into a wire feedstock.

4. The method of claim 3 further comprising removing surface contaminants from the plurality of reactive metal foils.

5. The method of claim 3 further comprising interweaving first metal reactive foils with second metal reactive foils.

6. The method of claim 3 wherein each of the plurality of reactive metal foils has a thickness in a range of 5-20 $\mu m$.

7. The method of claim 3 further comprising repeatedly compressing the stacked plurality of reactive metal foils at least 3 times.

8. The method of claim 3 wherein the plurality of reactive metal foils comprises at least one of a nickel foil, an aluminum foil, and a titanium foil.

9. The method of claim 3 further comprising repeatedly compressing the stacked plurality of reactive metal foils until a specific contact area metric threshold is exceeded.

10. The method of claim 9 wherein the specific contact area metric threshold is greater than 0.20 $\mu m^2/\mu m^3$.

11. An additive manufacturing feedstock production system comprising:
   a plurality of feedstock supplies configured to respectively output a plurality of reactive metal foils;
   a transition roller downstream from the plurality of feedstock supplies and configured to combine the plurality of reactive metal foils into a combined plurality of reactive metal foils with a first combined thickness;
   a work roller downstream from the transition roller and configured to compress the combined plurality of reactive metal foils to a second combined thickness less than the first combined thickness;
   a first mechanical processor downstream from the work roller and configured to
      segment and stack the combined plurality of reactive metal foils into a stacked plurality of reactive metal foils, and
      feed the stacked plurality of reactive metal foils into the work roller;
   the work roller configured to repeatedly compress the stacked plurality of reactive metal foils into a compressed stacked plurality of reactive metal foils with a stacked thickness equal to the second combined thickness; and
   a second mechanical processor configured to segment the compressed stacked plurality of reactive metal foils into a wire feedstock.

12. The additive manufacturing feedstock production system of claim 11 further comprising a pre-treater upstream of the transition roller and configured to remove surface contaminants from the plurality of reactive metal foils.

13. The additive manufacturing feedstock production system of claim 11 wherein the plurality of feedstock supplies comprises first metal reactive foils, and second metal reactive foils interweaved with the first metal reactive foils.

14. The additive manufacturing feedstock production system of claim 11 wherein each of the plurality of reactive metal foils has a thickness in a range of 5-20 µm.

15. The additive manufacturing feedstock production system of claim 11 wherein the work roller is configured to repeatedly compress the stacked plurality of reactive metal foils at least 3 times.

16. The additive manufacturing feedstock production system of claim 11 wherein the plurality of reactive metal foils comprises at least one of a nickel foil, an aluminum foil, and a titanium foil.

17. The additive manufacturing feedstock production system of claim 11 further comprising an additional roller downstream from the work roller.

18. The additive manufacturing feedstock production system of claim 11 wherein the plurality of feedstock supplies comprises first metal reactive foils, and second metal reactive foils interweaved with the first metal reactive foils.

19. The additive manufacturing feedstock production system of claim 11 wherein the work roller is configured to repeatedly compress the stacked plurality of reactive metal foils until a specific contact area metric threshold is exceeded.

20. The additive manufacturing feedstock production system of claim 19 wherein the specific contact area metric threshold is greater than 0.20 $\mu m^2/\mu m^3$.

* * * * *